United States Patent
Tsuchiya et al.

(10) Patent No.: US 8,107,824 B2
(45) Date of Patent: Jan. 31, 2012

(54) PASSIVE OPTICAL NETWORK SYSTEM AND COMMUNICATION METHOD THEREFOR

(75) Inventors: Akihiko Tsuchiya, Yokohama (JP); Yusuke Yajima, Fujisawa (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 950 days.

(21) Appl. No.: 12/109,431

(22) Filed: Apr. 25, 2008

(65) Prior Publication Data

US 2009/0010650 A1  Jan. 8, 2009

(30) Foreign Application Priority Data

Jul. 6, 2007 (JP) .................................. 2007-177936

(51) Int. Cl.
*H04B 10/00* (2006.01)
(52) U.S. Cl. ........................ 398/168; 396/167.5; 396/168
(58) Field of Classification Search .................... 398/59, 398/72, 99–100, 202, 214, 165–168
See application file for complete search history.

(56) References Cited

U.S. PATENT DOCUMENTS 7,917,032 B2 * 3/2011 Mori ............................... 398/72
2008/0056721 A1 * 3/2008 Mori ............................. 398/100
2008/0187312 A1 * 8/2008 Kazawa et al. ................. 398/63
2009/0129773 A1 * 5/2009 Oron ............................... 398/10

OTHER PUBLICATIONS

ITU-T, G.984.1, Mar. 2003.
ITU-T, G.984.2, Mar. 2003.
ITU-T, G.984.3, Mar. 2004.

* cited by examiner

*Primary Examiner* — Dzung Tran
(74) *Attorney, Agent, or Firm* — Mattingly & Malur, PC

(57) ABSTRACT

In a passive optical network system in which communication signals from a master station to a plurality of subsidiary stations are multiplexed by time division and transmitted, after converting (modulating) data with a high transmission speed to a low transmission speed, a base speed, in the master station, a header including an identifier destined for each subsidiary station is attached to the data with a low transmission speed and the converted data, respectively, the data and the header being multiplexed by time division inside a frame and transmitted to the subsidiary stations at the base speed. In the subsidiary station having received the concerned frame, only the data destined for the station itself is read, on the basis of the identifier included in the header, and by means of demodulation, the converted data are reconverted to the original high speed data and supplied to a user terminal.

3 Claims, 12 Drawing Sheets

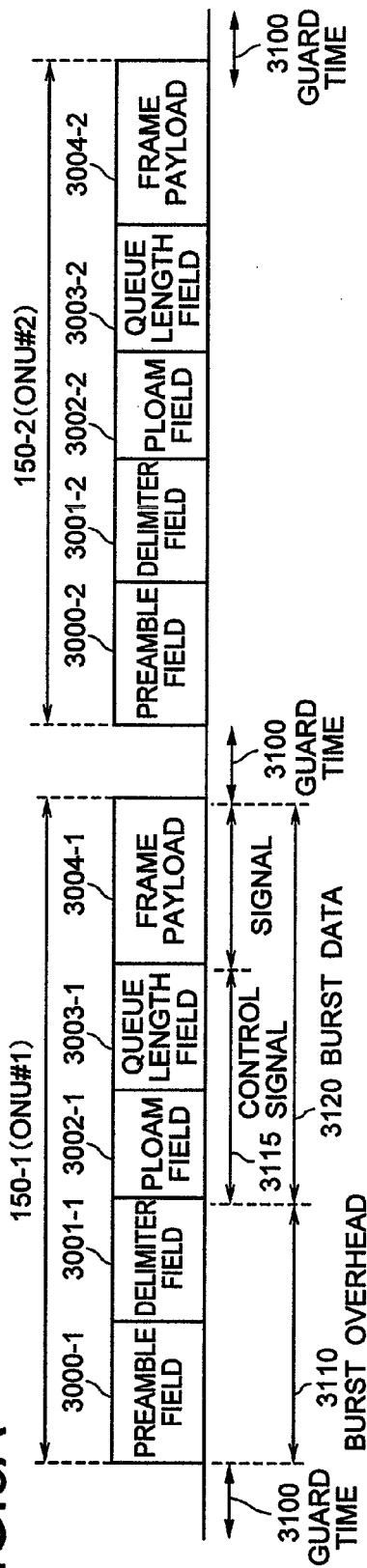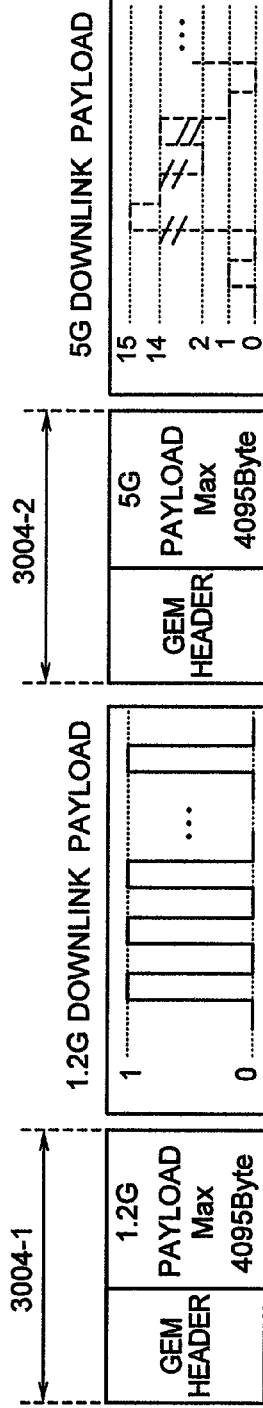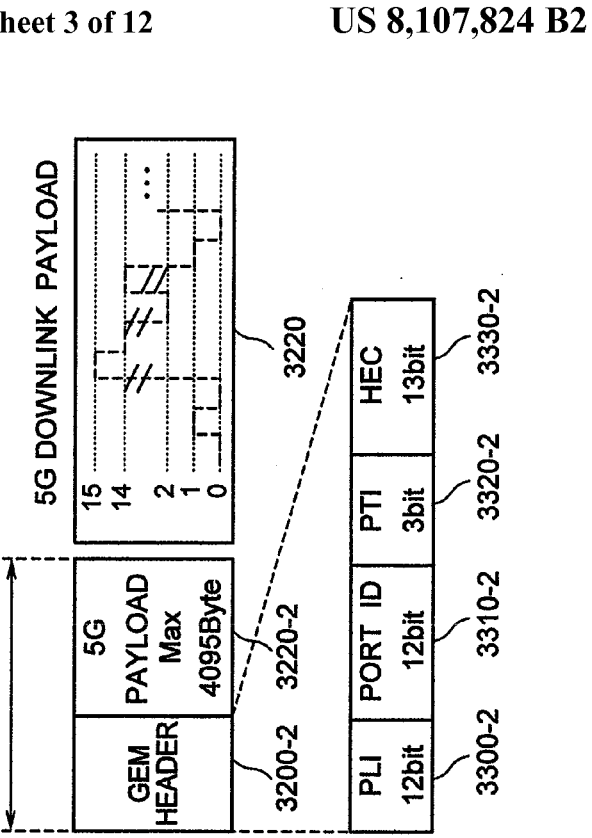
FIG.3A  FIG.3B  FIG.3C

| ONU NUMBER | SPEED CLASS | PORT ID |
|---|---|---|
| 1 | 2.5G | 1 |
| 2 | 10G | 2049 |
| 3 | 2.5G | 2 |
| 4 | 2.5G | 3 |
| 5 | 10G | 2050 |
| 6 | 2.5G | 4 |
| ⋮ | ⋮ | ⋮ |
| n | 10G | 4095 |

PORT ID
2.5G：0〜2047
10G：2048〜4095

| TRANSMITTED DATA VALUE | M-LEVEL SIGNAL MODULATION LEVEL |
|---|---|
| 0000 | 0 |
| ⋮ | ⋮ |
| 1111 | 15 |

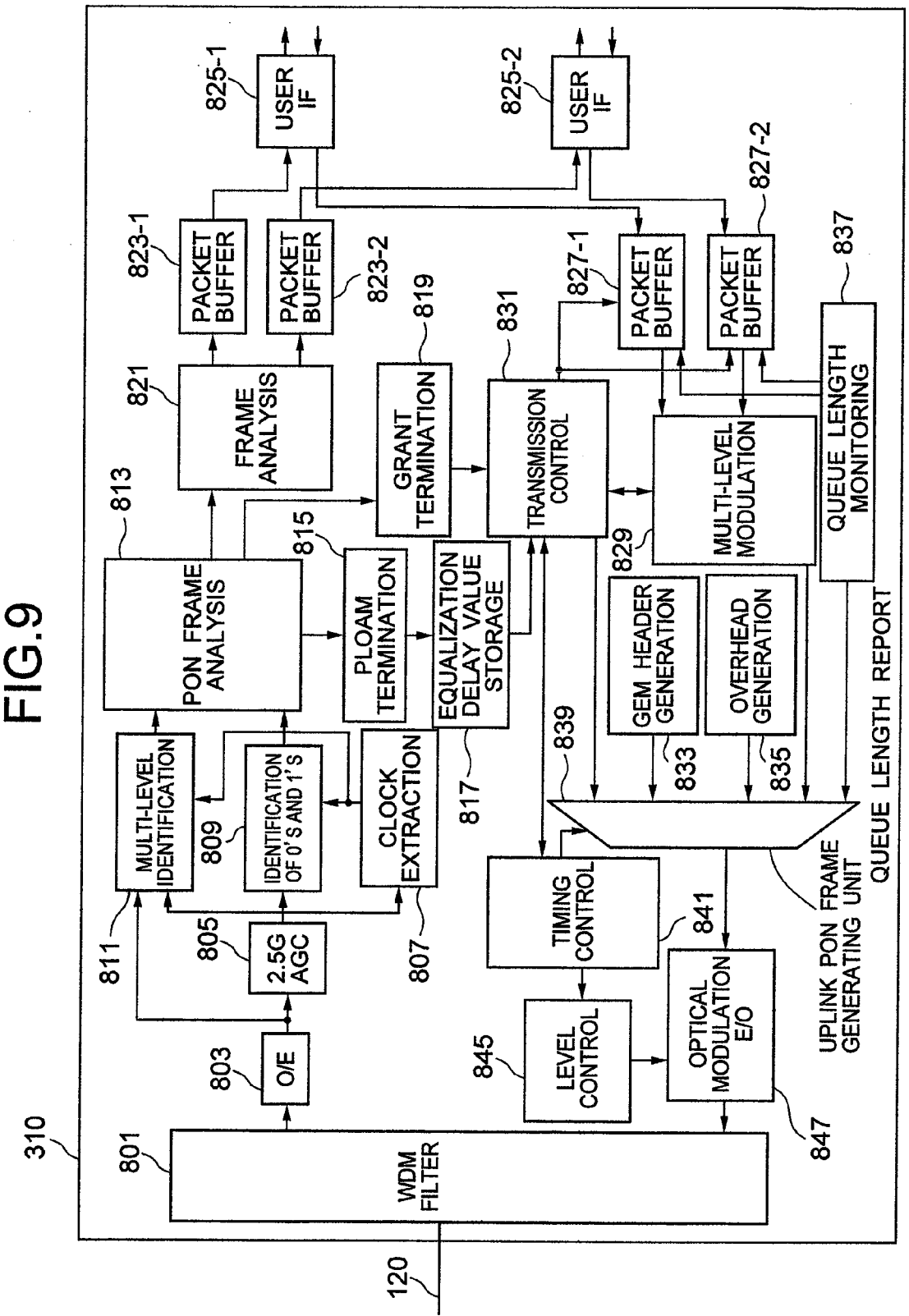

PASSIVE OPTICAL NETWORK SYSTEM AND COMMUNICATION METHOD THEREFOR

INCORPORATION BY REFERENCE

The present application claims priority from Japanese application JP2007-177936 filed on Jul. 6, 2007, the content of which is hereby incorporated by reference into this application.

BACKGROUND OF THE INVENTION

The present invention pertains to the structure of a passive optical network system, in which a plurality of subscriber connection devices share an optical transmission line, as well as a communication method therefor.

In order to transmit and receive large-capacity signals and data via a communication network, the attainment of higher speeds and larger bandwidths of communication networks is being advanced as well in the access network connecting subscribers to a communication network, and the introduction of a Passive Optical Network (hereinafter referred to as "PON") system specified in Recommendation G.984.1 to G.984.3 et cetera of the International Telecommunications Union (hereinafter referred to as "ITU-T") is aimed for. A PON is a system connecting an Optical Line Termination (hereinafter referred to as "OLT") connected with a host communication network; and Optical Network Units (hereinafter referred to as "ONU") accommodating a plurality of subscriber terminals (PCs or telephones) connected with a passive optical network consisting of a trunk optical fiber and branch optical fibers. Specifically, it is a system carrying out communication with a mode in which the signals coming from the terminals (PCs and the like) connected to each ONU are sent as optical signals from branch optical fibers via an optical splitter and optically multiplexed (by time division) with the trunk optical fiber to the OLT and the OLT carries out communication processing of the signals from each ONU and either transmits them to the host communication network or transmits them to another ONU connected to the OLT.

The development and introduction of the PON started from a system handling signals with low speeds such as 64 kbit/s and is now proceeding with BPON (Broadband PON) transmitting and receiving fixed-length ATM cells at speeds of at most approximately 600 Mbit/s or EPON (Ethernet PON) transmitting and receiving variable-length Ethernet® packets at speeds of at most approximately 1 Gbit/s, and GPON (Gigabit PON) handling higher-speed signals on the order of 2.4 Gbit/s and standardized in ITU-T Recommendations G.984.1, G.984.2, and G.984.3. Moreover, in the future, there is demanded the implementation of high-speed PON system capable of handling signals from 10 Gbit/s to 40 Gbit/s. As means of implementing these high-speed PON systems, there are investigated multiplexing methods such as TDM (Time Division Multiplexing) multiplexing by time division, WDM (Wavelength Division Multiplexing) multiplexing by wavelength division, and CDM (Code Division Multiplexing) multiplexing by code division, a multitude of signals. Further, the present PON has adopted TDM, but e.g. GPON has a structure using different wavelengths for uplink signals (from ONU to OLT) and downlink signals (from OLT to ONU) and, as for the communication of the OLT with each ONU, allocating signal communication time with respect to each ONU. Also, there has been an evolution from structures processing existing fixed-length signals to structures that also handle variable-length signals (burst signals) which handle burst-shaped signals of diverse classes (audio, image, data, et cetera) more easily. For high-speed PONs from now on, there are also being investigated various multiplexing methods, but TDM is in the process of becoming the main direction of investigation.

In each of the aforementioned PON modes, the distance from the OLT to the ONU differs, since ONUs are installed in subscriber residences interspersed in various places. That is to say that, since the optical fiber lengths of the trunk optical fiber and the branch optical fiber combined from the OLT to each ONU (the transmission distance) have a random variation, the transmission delay between each ONU and the OLT has a random variation, so even if each ONU transmits a signal, there is a possibility that the optical signals output from each ONU collide and interfere with each on the trunk optical fiber. For this reason, using e.g. the technology of ranging such as e.g. specified in Chapter 10 of Recommendation G.984.3, the system operates in each PON so as to regulate, after carrying out a measurement of the distances between the OLT and the ONUs, the delay of the output signal of each ONU such that the signal outputs from each ONU do not collide.

Moreover, the OLT operates, using technology referred to as Dynamic Bandwidth Assignment (hereinafter referred to as "DBA"), so as to designate the transmission timing for each ONU so that the optical signal from each ONU does not collide or interfere on the trunk optical fiber when deciding on the bandwidth for the signal authorizing transmission for each ONU on the basis of transmission requests from each ONU, after taking into account the delay quantities measured with the aforementioned ranging. That is to say that the PON is configured such that the operation of the communication is performed under the condition that the timing of signals transmitted and received between the OLT and each ONU is managed inside the system.

In the transmission and reception of signals between the OLT and each ONU, according to e.g. the specification of Ch. 8.8.3 of Rec. G.984.2, there are added to the data (also referred to as the payload): a guard time for interference prevention and consisting of at most 12 bytes at the head of the signal from each ONU making it possible for the OLT to identify and process the signals multiplexed on the trunk optical fiber and coming from each ONU; a preamble utilized for the determination of the signal identification threshold value of the receiver inside the OLT and for clock extraction, a burst overhead byte called a delimiter which identifies pauses in the received signal; and a PON control signal (also referred to as overhead or a header). Further, since each piece of data is a piece of variable-length burst data, there is also added, at the head of each piece of data, a header called a GEM (GPON Encapsulation Method) header for processing variable-length data. Moreover, in the signal from the OLT destined for each ONU, there is a structure in which, at the head of signals transmitted from the OLT to each ONU, a frame synchronization pattern for identifying the head; a PLOAM field transmitting monitoring, maintenance, and control information; and overhead (also referred to as a header) called a grant field designating the signal transmission timing of each ONU are added to the data multiplexed by time division and destined for each ONU, to make it possible for each ONU to identify and processing signals from the OLT. Further, in the data destined for each ONU, there is added a GEM header for processing variable-length data, similarly to the signals from the ONUs. Using the grant field, the OLT designates the authorized timing for the uplink transmission (beginning (Start) and end (Stop) of transmission) of each ONU in byte units. This authorized timing for transmission is referred to as a grant. And then, when each ONU transmits data destined for the OLT during the concerned authorized timing, these are optically (by time division) multiplexed on the optical fibers and received by the OLT.

SUMMARY OF THE INVENTION

In the PON, signals from the OLT to a plurality of ONUs are multiplexed by time division and are transmitted to all ONUs. That is to say that each ONU temporarily receives all communication signals from the OLT to each ONU even if the bandwidth of the signals (signal volume) provided to the ONU is small, identifies the communicated contents destined for itself using headers (specifically the ONU identifiers referred to as the GEM header PORT ID in the case of GPON and the LLID in the case of EPON), and brings into the inside of the ONU only the identified information and transfers the same to a subscriber (user). As mentioned above, as for the PON, the development and introduction have gradually advanced from a system processing low-speed signals to one processing high-speed signals, like the transition from the BPON to the GPON. However, for each of the PONs, standardization is progressing together and exchanges and protocols of the transmission speed of the signals and the control signals are considered so as to absorb the old PONs as well, but the present state is not a form having complete compatibility but rather, different forms have come to be decided for each PON. For this reason, at a time when there has arisen a need for the ONU to support speeds at or above the transmission speeds handled with the prior art by means of an extension of the communication service capacity, there is a need to adopt (by replacement) a new PON in the transmission speeds for all PONs are extended, such as replacing BPON with GPON. That is to say that there is a need to make an exchange to new equipment, for the OLT and all ONUs connected to the OLT, which adapts to a PON whose transmission capacity has been newly extended.

If the introduction and utilization modes of a PON are considered, notwithstanding the fact that the needs for the provision of higher-speed service capacity will gradually increase, it is not the case that the needs will all change in an instant, it being possible to consider that the utilization of unit of the users will start and gradually grow but that during this time, there will also exist in large numbers of subscribers finding the existing PONs to be sufficient. To exchange existing PONs with novel PONs, as mentioned above, amounts to carrying out an exchange of all OLTs and ONUs, so large expenses for the purpose of the exchange become necessary. Also, if one considers the essence of the aforementioned extension of communication capacity, it also leads to equipment exchange that is not yet necessary for some users and it can also lead to bringing about a comparatively high expense burden for carriers introducing PON and users utilizing PON. Because of this, there is demanded a PON, and a communication method therefor, with a structure making it possible to interconnect PON equipment with differing transmission speeds and switching over to a new PON that gradually accommodates existing PONs and making it possible to make coexist and operate a plurality of PONs having different specifications and performance.

It is a task of the present invention to provide a PON, and a communication method therefor, with a structure making coexist and operating a plurality of PONs with differing specifications (standards). More specifically, the task is to provide a PON, and a communication method therefor, comprising an OLT and ONUs with a structure that accommodates the coexistence of a plurality of ONUs having different signal transmission speeds, in a PON performing time division multiplexing of signal communication between an OLT and each ONU.

The signals transmitted and received between the OLT and each ONU of the PON are constituted by control signals and overhead (headers) for carrying out settings and control of a system exchanging protocols, such as mentioned above, and signals (data, image signals, audio signals, and the like, hereinafter referred to very simply as "data") transmitted and received by PON users via the OLT and the ONUs. Among these, headers (several tens of bytes) are added, for each frame with a 125 μs period, to the data transmitted and received by the user, but the control signal itself included in this header is transmitted and received once for several frames, after being processed inside the OLT and the ONU the setting and control of the PON is carried out. That is to say that the information itself of each header is not anything that needs to be sent at a positively high speed. On the other hand, the provision of high-speed service capacity requested by the user amounts to transmitting and receiving large volumes of data in a short time, so there is a need to transmit and receive at high speed in response to a request for data inside the frame.

The PON is a network that is operated in a state in which the transmission and reception timing of the signals is managed on the basis of the aforementioned ranging or DBA technology. Consequently, even if data with a plurality of speeds are consolidated, the positions of the same (transmission and reception timing) can be grasped and processed. That is to say that, granted that an error resulting from data consolidation has temporarily occurred, an appropriate course of action with an error mask or the like is possible.

The present application is one focusing on the characteristics of the aforementioned PON, and which, in order to attain the aforementioned task, has the structure of a PON capable of making coexist and operating a plurality of PONs with differing specifications (standards) in which, in a PON performing time division multiplexing of communication between an OLT and each ONU: the lowest transmission speed is taken to be the base speed in the case of accommodating the coexistence of a plurality of ONUs having differing signal transmission speeds; overhead bytes and low transmission speed data are transmitted and received with the concerned base speed left as is; high transmission speed data are converted into data modulated at the concerned base speed; and headers and data fields, as post-modulation data, are multiplexed by time division within the frame and transmitted and received.

More specifically, since ONU-bound data having differing transmission speeds coexist in the OLT, a header including identifiers destined for each ONU as well as the signal transmission timing authorized for the concerned ONUs, low transmission speed data, and post-conversion data, are multiplexed by time division and transmitted to each ONU after high transmission speed data have been converted (modulated) in transmission speed. The present application has a structure in which, in an ONU having received the concerned frame, only the data destined for the ONU itself are brought in to the concerned ONU, on the basis of the identifiers included in the frame, and the post-conversion data are reconverted (returned) by means of demodulation to the original high-speed data and supplied to a user terminal.

Among the respective ONUs, the ONUs transmitting data at the base speed generate a frame consisting of a header and data and transmit the concerned frame with a timing indicated by the OLT, at the concerned speed. On the other hand, the ONUs transmitting data at a high speed convert data from the terminal modulated at the base speed, generate a frame consisting of a header and post-conversion data, and transmit the concerned frame at the base speed and with a timing indicated by the OLT. Also, the present application has a structure in which, when the OLT receives the signal obtained by multiplexing the frames from each ONU on the trunk optical fiber, it reconverts (returns) the concerned data at the timing at which it receives converted high speed data, by means of demodulation, to the original high speed data and transmits the same to a communication network outside the OLT.

Further, as for the modulation of high transmission speed data at the base speed, a structure is taken in which the original high speed binary signal of 0's and 1's is converted into an m-valued multi-level signal at the base speed (m>2, being e.g. $2^4=16$ in the case of a speed four times higher), and a structure is chosen in which the data are converted with amplitude modulation or phase modulation.

Stated in greater detail, the communication signals from the OLT to a plurality of ONUs comprise packets consisting of a first field for which the data transmission speed is N (bit/s) and a second field for which the data transmission speed is M (M being an integer) times N (bit/s) and having headers and payload signals (data) corresponding to the respective fields, and are chosen to have a structure in which the concerned packet signals are multiplexed by time division and transmitted. The aforementioned packet signals are devised so as to identify the first field for which the data transmission speed is N (bit/s) and the second field for which the data transmission speed is M (M being an integer) times N (bit/s) and, in case the packet signal header indicates that the field is that for which the data transmission speed is M times N (bit/s), it carries out time division multiplexing using an m-valued multi-level signal for the corresponding payload signal. Further, as for the OLT, a structure is chosen in which, upon activating each ONU, it identifies whether the transmission speed of the concerned ONU corresponds to N (bits/s) or M times N (bit/s) and, in case the speed corresponds to M times N (bit/s), starts communication with the ONU after transmitting a control message setting a header value corresponding to the second field in the ONU. That is to say that, by using an m-valued multi-level signal for the aforementioned payload signal corresponding to the second field, the bit time width of the transmission signals transmitted and received between the OLT and the ONU is chosen to be the same as the width of the base speed.

Moreover, as for the reception circuit of the OLT or an ONU of a conventional PON, since there are cases of handling only a single transmission speed and not being able to correctly receive an m-valued multi-level signal, the reception clock extraction circuit does things like malfunctioning, so it may be thought that frame synchronization failure will be detected and that there is a possibility of communication getting interrupted, but, in the structure of the present application, the ONU identifies only information destined for the ONU itself using headers, and since a structure is chosen in which the OLT controls the reception circuit and the multi-level modulation and demodulation circuit upon grasping the speed of the received data and the timing of data transmission and reception, it never occurs that the content thereof is interpreted by mistake or that a reception alarm is generated, even if m-valued multi-level signals coexist in the payload of the packets multiplexed in the frame.

By making it possible, in a PON in which communication signals from an OLT to a plurality of ONUs are multiplexed by time division and transmitted, to accommodate in coexistence a plurality of ONUs with differing transmission speeds, it becomes possible to suppress exchange expense of the communication devices even if there occurs a request for an extension of the communication service capacity, due to the fact that only the corresponding OLT and ONU exchange information.

Other objects, features and advantages of the invention will become apparent from the following description of the embodiments of the invention taken in conjunction with the accompanying drawings.

BRIEF DESCRIPTION OF THE DRAWINGS

FIGS. 3A to 3C are signal structure diagrams showing a configuration example of optical signals from an ONU to the OLT.

FIG. 6 is a table structure diagram showing a configuration example of a storage field storing PON identifiers.

FIG. 7 is an explanatory diagram describing a working example of a multi-level modulating unit.

FIG. 9 is a block diagram showing a configuration example of an ONU for 10 G.

DETAILED DESCRIPTION OF THE INVENTION

Hereinafter, there will be given an explanation in detail, using the drawings, of the structure and operation of a PON according to the present invention, and citing as an example the structure and operation of a PON in which there coexist a GPON specified in ITU-T Rec. G.984 and 10 GPON handling data at four times the transmission speed of GPON whose introduction is anticipated from now on.

In the explanation below, the assumption is one of a PON with a structure, similar to that of GPON, that multiplexes by time division variable-length data and processes the same, and taking as examples, for the downlink data transmission speed from the OLT to each ONU, 2.5 Gbit/s (2.48832 Gbit/s but referred to below as 2.5 Gbit/s for simplification) of GPON and 10 Gbit/s (9.95328 Gbit/s but similarly referred to below as 10 Gbit/s) of 10 GPON. Also, as for the uplink data transmission speed from an ONU to the OLT, the explanation is given taking as examples 1.2 Gbit/s (1.24416 Gbit/s but similarly referred to below as 1.2 Gbit/s) of GPON and 5 Gbit/s (4.97664 Gbit/s but similarly referred to below as 5 Gbit/s) of 10 GPON. Further, these numerical values of transmission speed and the like are examples, the present invention not being limited to these numerical values.

Figure 1:
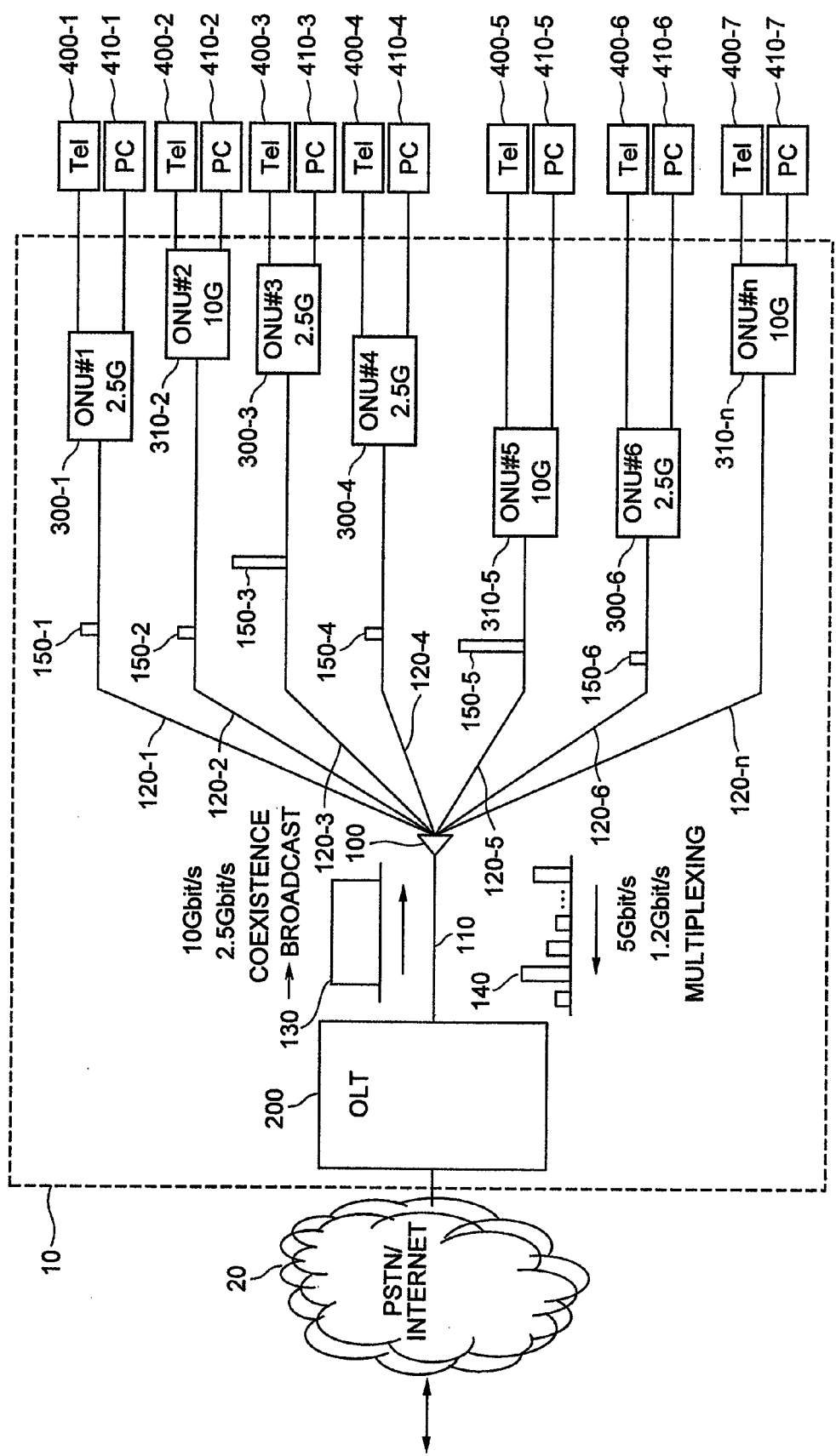
FIG. 1 is a network structure diagram showing a configuration example of an optical access network using a PON.

FIG. 1 is a network block diagram showing a configuration example of an optical access network using a PON.

An access network 1 is a network carrying out, via a PON 10, communication by connecting a public communication network (PSTN)/Internet 20 (below sometimes referred to as a host network), being a host communication network, and subscriber terminals (telephone 400, PC 410, et cetera). PON 10 is provided with an OLT 200 (sometimes referred to as a master station) connected with host network 20, and a plurality of ONUs 300 and 310 (below sometimes referred to as subsidiary stations) accommodating subscriber terminals (telephone 400, PC 410, et cetera), and connects OLT 200 and each ONU 300 and 310 with an optical receiving network consisting of a trunk optical fiber 110, an optical splitter 100, and a plurality of branch optical fibers 120 to perform communication between host network 20 and subscriber terminals 400 and 410, or among subscriber terminals 400 and 410.

ONU 300 is a GPON (downlink speed 2.5 Gbit/s) ONU and ONU 310 is a 10 GPON (downlink speed 10 Gbit/s) ONU, and even in the case where the two PONs coexist, there is the possibility of connecting at most 64 OLT 200, following the present Rec. G.984. In FIG. 1, seven ONU 300 or 310 are illustrated, there coexisting 2.5 G ONUs #1, 3, 4, and 6 (300-1, 300-3, 300-4, and 300-6) capable of receiving data at a transmission speed of 2.5 Gbit/s for downlink data signals and 10 G ONUs #2, 5, and n (310-2, 310-5, and 310-$n$) capable of receiving data at a transmission speed of 10 Gbit/s for downlink data signals, and being connected with OLT 200.

As will be subsequently described in detail, a downlink signal 130 transmitted in the direction from OLT 200 to ONUs 300 and 310 has the signals for each ONU 300 or 310 multiplexed by time division and broadcast. As for the signal received by each ONU 300 or 310, it is determined inside ONU 300 or 310 whether the signal is destined for the ONU itself and, on the basis of the destination of the signal, it is sent to a telephone 400 or a PC 410. Also, in the direction from ONU 300/310 to OLT 200, an uplink signal 150-1 transmitted from ONU 300-1, an uplink signal 150-2 transmitted from ONU 310-2, an uplink signal 150-3 transmitted from ONU 300-3, an uplink signal 150-4 transmitted from ONU 300-4, an uplink signal 150-5 transmitted from ONU 310-5, an uplink signal 150-6 transmitted from ONU 300-6, and an uplink signal 150-$n$ transmitted from ONU 310-$n$ turn into an optically multiplexed signal 140 optically multiplexed by time division via optical splitter 100 and arrive in OLT 200. Further, since the fiber length differs between ONUs 300 and OLT 200, there is adopted for signal 140 a mode in which signals with differing amplitudes are multiplexed.

Further, 1.5 μm waveband optical signals are used for downlink signals 150 and 1.3 μm waveband signals are used for the uplink signals, both optical signals being multiplexed by wave division (WDM) and transmitted and received on the same optical fibers 110 and 120.

FIGS. 2A to 2D and FIGS. 3A to 3C are respectively signal block diagrams showing configuration examples of an optical signal from the OLT to an ONU and an optical signal from an ONU to the OLT. The structure of the 10 GPON optical signals is at present not yet specified, but since it is one in which variable length data from both GPON and 10 GPON can be handled, it may be considered realistic (practical) with a structure processing signals at each transmission speed by time division multiplexing according to a signal structure that is similar to that of GPON which is specified in a current recommendation. Consequently, in the embodiment mentioned hereinafter, an explanation of the function of the PON will be given on the basis of the signal structure specified with GPON. Of course, this signal structure and this PON operation are an example, the present invention not being limited to this structure or operation.

Figure 2A:
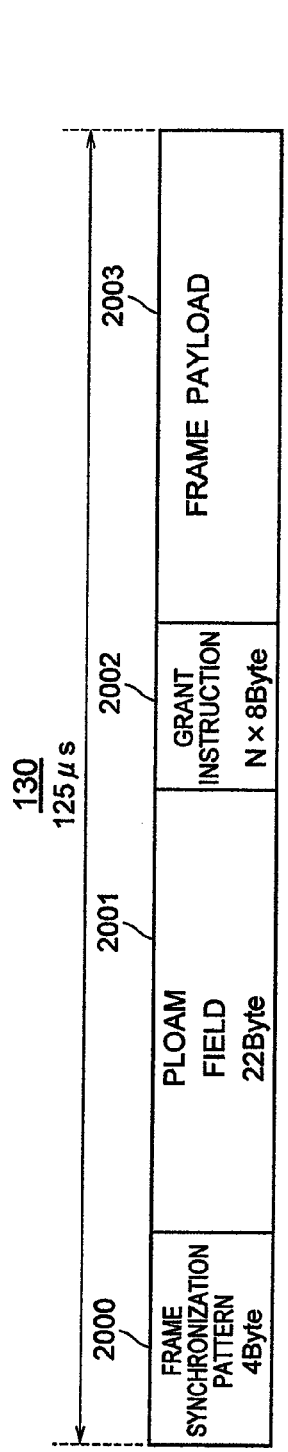
FIGS. 2A to 2D are signal structure diagrams showing a configuration example of optical signals from an OLT to an ONU.

The signal from OLT 200 to each ONU 300 or 310 is called downlink signal 130 and, as shown in FIG. 2A, a 125 μs frame is constituted by: overhead consisting of a frame synchronization pattern 2000 for finding the head of the signal by each ONU 300 or 310, a PLOAM field 2001 transmitting information pertaining to monitoring, maintenance, and control with respect to each ONU 300 or 310, and a grant instruction field 2002 designating an uplink signal transmission timing from each ONU 300 or 310 to OLT 200; and a frame payload 2003 in which the data to each ONU 300 or 310 has been multiplexed by time division. This signal 130 is broadcast to each ONU 300 or 310. Each ONU 300 or 310 determines from the overhead whether the received signal is destined for itself and carries out transmission to destination terminal 400 or 410 for a wide variety of operations or received data corresponding to an overhead that will be explained hereinafter.

Figure 2B:
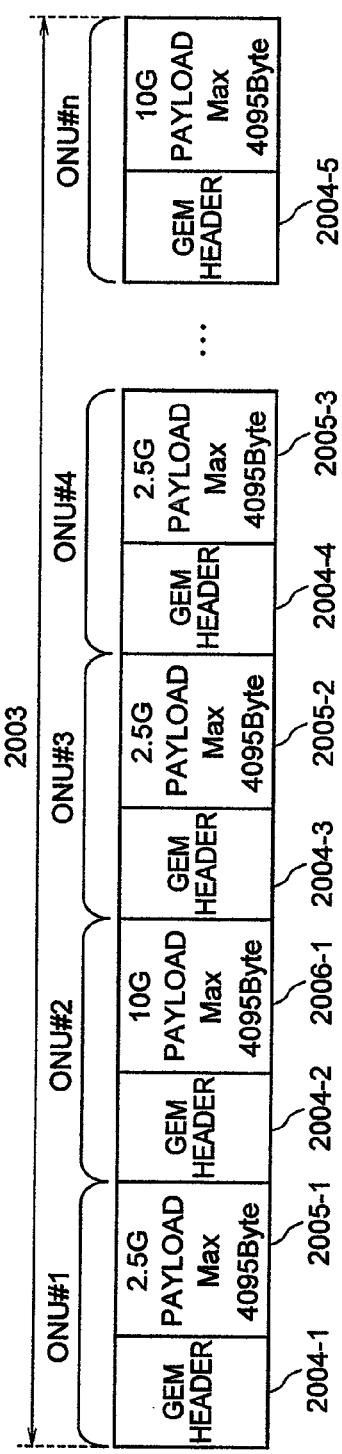
Figure 2C:

FIG. 2B is a structure diagram showing the detailed structure of frame payload 2003. Data destined for each ONU 300 or 310 (a 2.5 G payload 2005 or a 10 G payload 2006) are multiplexed by time division inside frame payload 2003 in a form wherein is added a GEM header 2004 used for data reception in each ONU, such as a data identifier for each ONU. FIG. 2C is a structure diagram showing the structure of GEM header 2004. The details of each byte are those specified in Rec. G.984.3 and so will be omitted, but in a PON of the present invention, a structure has been chosen in which an ONU 300 for 2.5 G and an ONU 310 for 10 G are identified using a PORT ID 2007 for identifying ONUs.

Figure 2D:
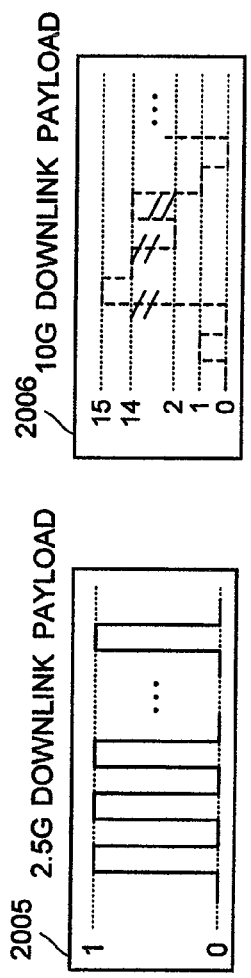

In accordance with this PORT ID 2007, data with a transmission speed of 2.5 Gbit/s are entered as <<0>> and <<1>> (ON/OFF) dual-level optical signals in 2.5 G payload 2005 and data with a transmission speed of 10 Gbit/s are entered, in 10 G payload 2006, as multi-level optical signals modulated into multiple optical levels (16 levels) from 0 to 15, as will be subsequently described, and converted to an actual transmission speed of 2.5 Gbit/s (refer to FIG. 2D). That is to say that in a PON of the present invention, control signals and data are multiplexed by time division at a transmission speed of 2.5 Gbit/s and transmitted to each ONU 300 or 310, and, as a unit hereof, 10 Gbit/s data received by 10 GPON ONU 310 are, upon being converted into 2.5 Gbit/s multi-level optical signals, multiplexed by time division in the frame of the same downlink signal 130 and transmitted.

Moreover, a signal from each ONU 300 or 310 to OLT 200 is called an uplink signal 150 and is, as shown in FIG. 3A, one in which there is added a burst overhead 3110 consisting of a preamble 3000 for recognition and processing by OLT 200 of burst data 3120 from each ONU 300 or 310, and a delimiter 3001, to: burst data 3120 consisting of a control signal 3115 consisting of a PLOAM field 3002 transmitting information regarding the monitoring, maintenance, and control of each ONU 300 or 310 and a queue length field 3003 reporting to OLT 200 the volume of data that each ONU 300 or 310 is waiting for to be transmitted, and a variable-length frame payload 3004 in which the data from terminals 400 and 410 of each ONU are entered. Further, a guard time 3100 shown before preamble 3000 is a null signal (optical signal OFF state) field for separating transmitted signals from each ONU, the total of this guard time 3100 and burst overhead 3110 being specified in Rec. G.984.3 to be at most 12 bytes. As shown in FIG. 1, the uplink from each ONU 300 or 310 is multiplexed by time division on trunk optical fiber 110 after passing through optical splitter 100, becomes multiplexed optical signal 140 and reaches OLT 200.

FIG. 3B is a structure diagram showing the detailed structure of frame payload 3004. Data (1.2 G payload 3210 or 5G payload 3220) from each ONU 300 or 310 are, similarly to the uplink signal, multiplexed by time division inside frame payload 3004 in a form where a GEM header 3200 used for the reception in OLT 200 of data such as data identifiers for each ONU is added. FIG. 3C is a structure diagram showing the structure of GEM header 3004. The details of each byte are specified in Rec. G.984, so an explanation thereof will be omitted, but in a PON of the present invention, a structure is chosen in which, using a PORT ID 3310 for identifying ONUs, ONU 300 for 2.5 G and ONU 310 for 10 G are identified.

In accordance with the contents of PORT ID 3310, data with a transmission speed of 1.2 Gbit/s are entered as <<0>> and <<1>> (ON/OFF) dual-level optical signals in 1.2 G payload 3210, and data with a transmission speed of 5 Gbit/s are entered, in 5 G payload 3220, as multi-level optical signals modulated into multiple optical levels (16 levels) from 0 to 15, as will be subsequently described, and converted to an actual transmission speed of 1.2 Gbit/s (refer to FIG. 3B). That is to say that in a PON of the present invention, control signals and data are multiplexed by time division at a transmission speed of 1.2 Gbit/s and transmitted from each ONU 300 or 310 to OLT 200, and, as a unit hereof, 5 Gbit/s data transmitted by 10 GPON ONU 310 are, upon being converted into 1.2 Gbit/s multi-level optical signals, transmitted as the frame of the same uplink signal 150.

Further, in the present embodiment, the transmission timing of uplink signal 150 from each ONU 300 or 310 was taken to be a timing determined in the same way as for the GPON specified in ITU-T Rec. G.984. Specifically, as will be subsequently described using FIG. 11 to FIG. 13, the structure is one in which, after control parameters required for system operation and referred to as ranging have been set in OLT 200 and each ONU 300 or 310 at the time of PON system launch, each ONU 300 or 310 transmits uplink signal 150 at the concerned timing toward OLT 200, if OLT 200 determines the data volume (bandwidth) allowed for transmission to each ONU by means of DBA on the basis of a queue length report received from each ONU 300 or 310 and the allowable traffic based on contract and reports the transmission authorization timing (grant) corresponding to the concerned determined bandwidth in grant instruction field 2002 to each ONU 300 or 310.

Figure 4:
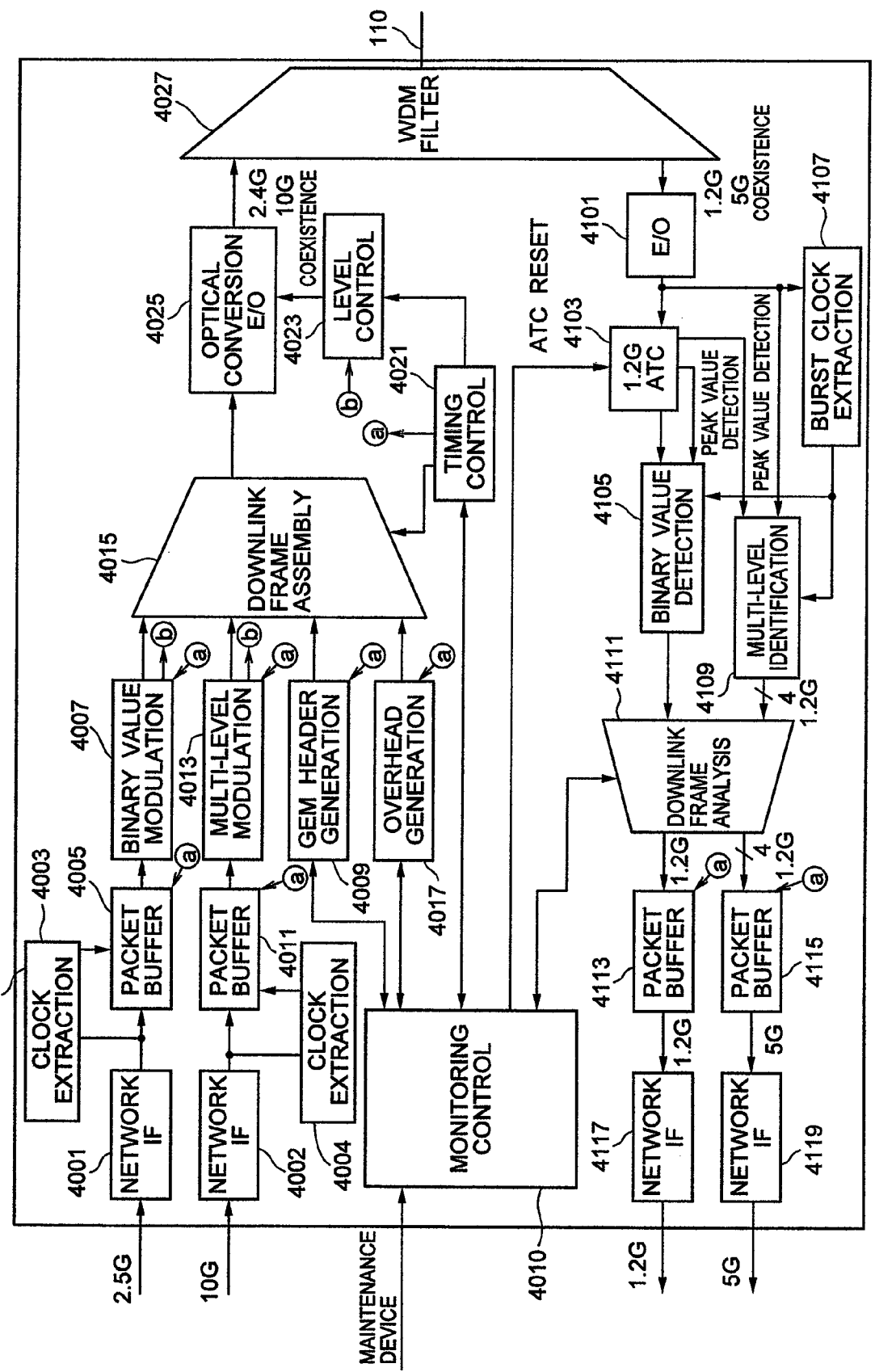
FIG. 4 is a block diagram showing a configuration example of an OLT.

FIG. 4 is a block diagram showing a configuration example of an OLT.

When OLT 200 receives data at transmission speeds of 2.5 Gbit/s and 10 Gbit/s transmitted to each ONU 300 or 310 on network IFs 4001 and 4002, being interfaces between host network 20 and a receiving network, a downlink frame generating unit 4015 assembles these stored data into downlink signal frame 130 shown in FIGS. 3A to 3C and transmits it to each ONU 300 or 310, after the concerned received data have temporarily been stored in packet buffers 4005 and 4011. Further, clock extracting units 4003 and 4004 are clock extraction circuits for extracting a clock from the received data and writing the received data to packet buffers 4005 and 4011, but if network synchronization is obtained, it does not matter if a clock generated in the OLT interior such as a timing control unit 4021 is used. Also, since data with a transmission speed of 10 Gbit/s are transmitted at 2.5 Gbit/s and multiplexed by time division into downlink signal 130, the data are converted, as will be subsequently described, into any of 16-level signals 0 to 15 in multi-level modulating unit 4013. The assembly of downlink signal 130 is carried out, on the basis of a control signal from a monitoring control unit 4010 or timing control unit 4021, by the operation of packet buffers 4005 and 4011, multi-level modulation unit 4013, a GEM header generating unit 4009, an overhead generating unit 4017, and downlink generating unit 4015 (details described subsequently).

Figure 5:
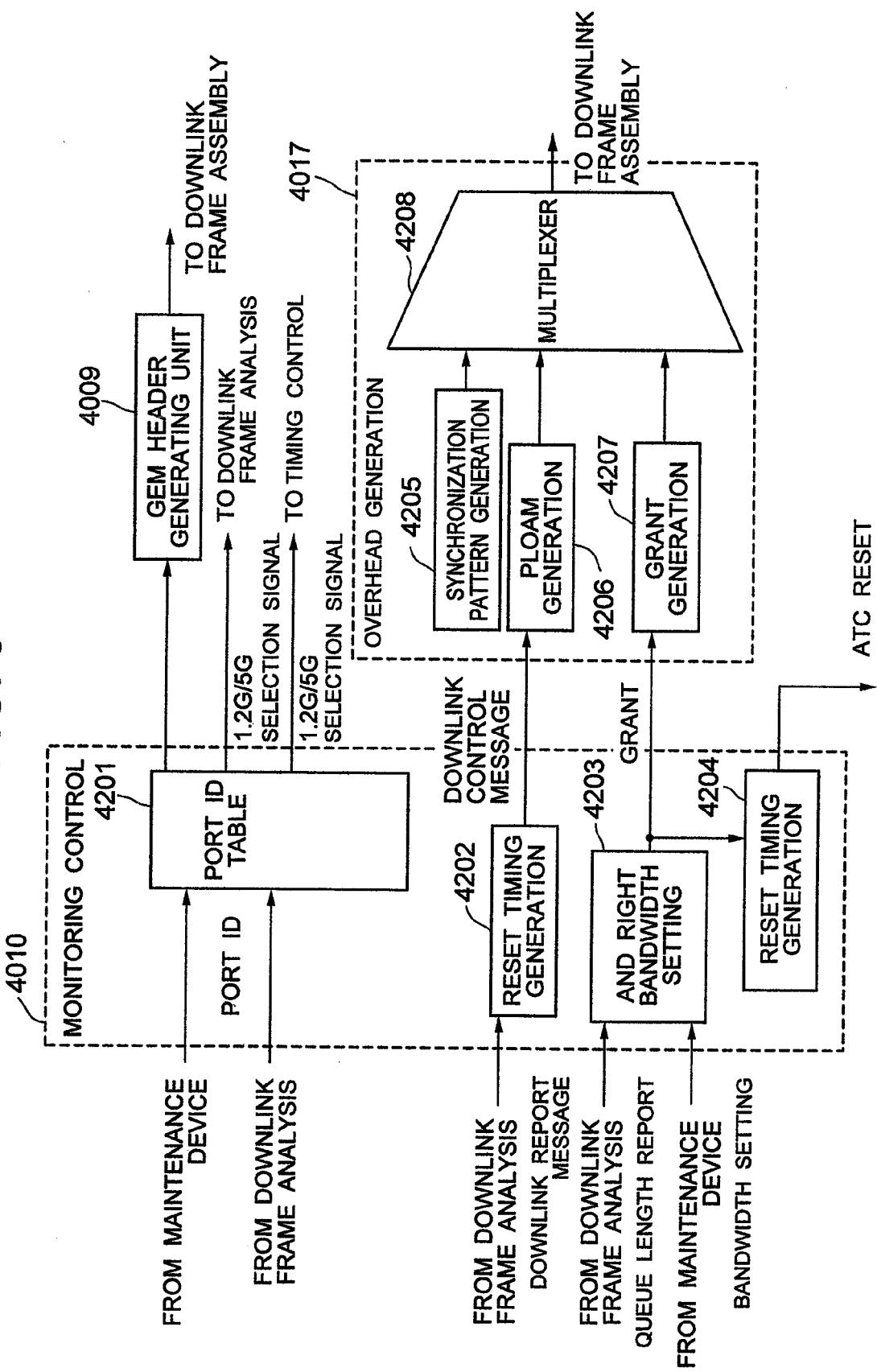
FIG. 5 is a block diagram showing a configuration example of a monitoring control unit and an overhead generating unit.

FIG. 5 is a block diagram showing a configuration example of a monitoring control unit and an overhead generating unit provided in the OLT and FIG. 6 is a table structure diagram showing a configuration example of a storage field (memory/table) provided in the monitoring control unit and in which are stored identifiers and control parameters for identifying each ONU 300 or 310 and terminals et cetera accommodated in the concerned ONU and executing the operation of the PON.

Overhead generating unit 4017 is constituted by a synchronization pattern generating unit 4205 generating a frame synchronization pattern (ref. 2000 in FIG. 2A); a PLOAM generating unit 4206 inserting into a PLOAM field (ref. 2001 in FIG. 2A) information (control messages) generated in monitoring control unit 4010 and pertaining to the monitoring, maintenance, and control of each ONU 300 or 310; a grant generating unit 4207 inserting into a grant instruction field (ref. 2002 in FIG. 2A) a grant (transmission timing) indicated to each ONU 300 or 310 determined with DBA by bandwidth setting unit 4203 of monitoring control unit 4010; and a multiplexer 4208; and generates the overhead, shown in FIG. 2A, with an instruction from timing control unit 4021 and transmits it to downlink frame assembly unit 4015.

Monitoring control unit 4010 is provided with a PORT ID table (memory) 4201 which is a storage field storing identifiers for identifying each ONU 300 or 310 and terminals et cetera accommodated in the concerned ONU and executing the operation of the PON, and keeping control parameters stored; a PON control message generating unit 4202 controlling PON 10 as a whole and producing information (control messages) pertaining to the monitoring, maintenance, and control of each ONU 300 or 310; and a bandwidth setting unit 4203 carrying out DBA.

PORT ID table 4201 is a table keeping information stored that is necessary for the control and identification of each ONU 300 or 310, the transmission speed of data handled by the concerned ONU (speed class: 42020) and identifiers (PORT ID: 42030) of ONUs and terminals determined in Rec. G.984 being set, corresponding to the number (ONU number: 42010) of each ONU 300 or 310, from a maintenance device (not illustrated). Moreover, PORT ID table 4201 may also be taken to be constituted, as will be subsequently described using FIG. 11 to FIG. 13, by a determination of PORT ID 42030 by OLT 200, on the basis of the speed class reported from each ONU 300 or 310. In the present embodiment, the structure is one where a unique PORT ID is provided, any one of 0 to 2047 to ONU 300 having a downlink data transmission speed of 2.5 Gbit/s and any one of 2048 to 4095 for ONU 310 having a downlink transmission speed of 10 Gbit/s, but the invention is not limited hereto. Also, in the present embodiment, there is shown an example in which one PORT ID is provided to one ONU 300/310, but, as also indicated in Rec. G.984, a structure in which a plurality of PORT ID 42030 are provided in response to the signal processing mode in ONU 300/310 is acceptable. In any event, PON 10 of the present invention is a network that identifies ONU 300 for 2.5 G and ONU 310 for 10 G on the basis of this PORT ID 42030 and, as will be described subsequently, makes 2.5 Gbit/s data coexist even with data obtained by multi-level modulating 10 Gbit/s transmission speed data, multiplexing the same by time division, and carries out communication between OLT 200 and ONU 300/310. Further, although it is not illustrated in FIG. 6, there is also included in PORT ID table 4201 other information needed for the control and identification of each ONU 300 or 310, and GEM header 2004, in which PORT ID 42030 is included in PORT ID field 2007 shown in FIG. 2C, is generated by GEM header generating unit 4009.

PON control message generating unit 4202 is a unit that transmits and receives protocols and control signals determined in Rec. G.984 between OLT 200 and ONU 300/310 and carries out monitoring, maintenance, and control of PON 10 as a whole and operates by means of a not illustrated processor and a control program. Also, bandwidth setting unit 4203 is a unit that determines by DBA bandwidth setting parameters with respect to each ONU 300 or 310 and terminal, set from a maintenance device (not illustrated) on the basis of a prior contract with the subscriber, and the bandwidth (the data volume allowed for transmission) allocated to each ONU on the basis of the volume of data waiting for transmission in the concerned ONU, reported by means of a queue length field (ref. 3003 in FIG. 3A) from the operating ONU 300/310, and that generates a grant which is an uplink signal (ref. 150 in FIG. 3A) transmission timing of each ONU and that, similarly to PON control message generating unit 4202, operates by means of a not illustrated processor (the same processor being acceptable), or a control program. Further, as for a practical DBA operating method, various proposals are made, it being acceptable to adopt an appropriate algorithm taking into account conditions such as the data traffic processed by the PON 10 provider, so a detailed explanation of the operation is omitted. Moreover, reset timing generating unit 4204 is a unit that, given that the uplink signal (ref. 150 in FIG. 3A) from each ONU 300 or 310 is multiplexed by time division at a timing determined by bandwidth setting unit 4203 and received by OLT 200, and since, as mentioned previously, the optical signal levels of these signals have a random variation, temporarily resets the signal reception level of the reception circuit (e.g. ref. 4103 in FIG. 1) of OLT 200 for each respective uplink signal 150 received and generates a timing for carrying out a rapid and accurate reception of the uplink signal.

FIG. 7 is an explanatory diagram describing a working example of a multi-level modulation unit provided in the OLT.

Multi-level modulation unit 4013 is a unit that converts data (with the binary values "0" and "1") with a transmission speed of 10 Gbit/s into multi-level data so that they can be transmitted at a transmission speed of 2.5 Gbit/s and is a unit that implements the same using a modulator with amplitude modulation, phase modulation, or the like. The same diagram is one that explains the operating principles thereof in the case of adopting amplitude modulation and shows the operation of generating a control signal modulating by amplitude modulation levels 4310, of an optical signal consolidated from a 10 Gbit/s signal of 0's and 1's for every four consecutive bits and transmitted in response to a pattern 4300 of the concerned four bits, in increments of 2.5 Gbit/s to any of 16 levels from 0 to 15. Specifically, the level control values may be output by constituting a flip-flop circuit temporarily storing four-bit consecutive data and an encoder, or by having a storage element such as a ROM (Read Only Memory) store level control values corresponding to a bit pattern and outputting the same. This output is transmitted to a level control unit 4023 explained subsequently and the levels of the optical signals transmitted to each ONU 300 or 310 are, as shown in FIG. 2D, multi-level modulated by amplitude modulation. Further, in the present embodiment, there was shown an example of amplitude modulation, but the multi-level modulation format is not limited hereto, any multi-level modulation other than phase modulation being acceptable. Also, the location where the modulation is actually applied may be any of the downlink signal 130 generating processes of OLT 200, and is not one limited to that of the present embodiment.

Downlink frame assembly unit 4015 of OLT 200 assembles, as shown below, downlink signal 130 using packet buffers 4005 and 4011, multi-level modulation unit 4013, GEM header generating unit 4009, and overhead generating unit 4017, which operate on the basis of control signals from monitoring control unit 4010 or timing control unit 4021.

1. It receives a signal from overhead generating unit 4017 and assembles an overhead consisting of frame synchronization pattern 2000, PLOAM field 2001, and grant instruction field 2002.

2. In frame payload 2003, situated after the overhead, when monitoring control unit 4010 determines the sequence in which data destined for each ONU 300 or 310 is multiplexed, it receives GEM headers 2004 destined for each ONU 300 or 310 in this determined sequence from GEM header generating unit 4013, and next enters data corresponding to whether the concerned ONU is for 2.5 G or 10 G. Specifically, if the data are data with a 2.5 Gbit/s transmission speed, it reads only the length determined in monitoring control unit 4010 from packet buffer 4005 via a binary value modulation unit 4007 and enters the data into 2.5 G payload 2005 after GEM header 2004. Further, it does not matter if binary value modulation unit 4007 is not present, if the original data are binary <<0>> and <<1>> data. Moreover, if the data are data with a 10 Gbit/s transmission speed, it reads the data from packet buffer 4011 via multi-level modulation unit 4013 at a speed of 2.5 Gbit/s so that only a length determined by monitoring control unit 4010, of a signal converted into a signal controlling the concerned data to be any level of the multiple levels is continued after GEM header 2004 and enters the signal after multi-level modulation into 10 G payload 2006 after GEM header 2004 (refer to FIGS. 2B to 2D).

3. Since monitoring control unit 4010 determines the length and sequence of the data destined for ONU 300/310 multiplexed by time division inside frame payload 2003 so that the frame length becomes 125 µs, it repeats Item 2 in accordance with this decision.

Downlink signal 130 assembled by frame assembly unit 4015 is converted from an electrical signal into an optical signal by an optical modulation unit (E/O: ref. 4025). On this occasion, level control unit 4023 controls the level of a 2.5 Gbit/s optical signal in either bit of byte units by means of an instruction of timing control unit 4021. Specifically, as for the signals of the overhead (refs. 2000, 2001, and 2002 in FIG. 2A), GEM header 2004, and 2.5 G payload 2005, the levels are set such that optical signals with the binary values "0" and "1" can be received at each ONU 300 or 310, and as for the signals of 10 G payload 2006, levels are set and the optical signal transmission levels of downlink signal 130 are controlled (refer to FIG. 2D) such that multi-level optical signals can be received at each ONU 310. The output of optical conversion unit 4025 is broadcast via WDM filter 4027 and through trunk optical fiber 110 to each ONU 300 or 310.

According to the aforementioned structure and operation of the OLT, even if it comes about that a novel transmission of high-speed data such as at 10 Gbit/s is demanded of a GPON operating at 2.5 Gbit/s, a PON provided with an OLT and ONUs with a structure capable of accommodating in coexistence these signals with differing transmission speeds and operating, as well as a communication method therefor, are devised so as to easily be able to provide the transmission. Further, there will separately be given an explanation regarding the structure and operation of the processing of the uplink signals, after briefly explaining the structure and operation of the ONU.

Figure 8:
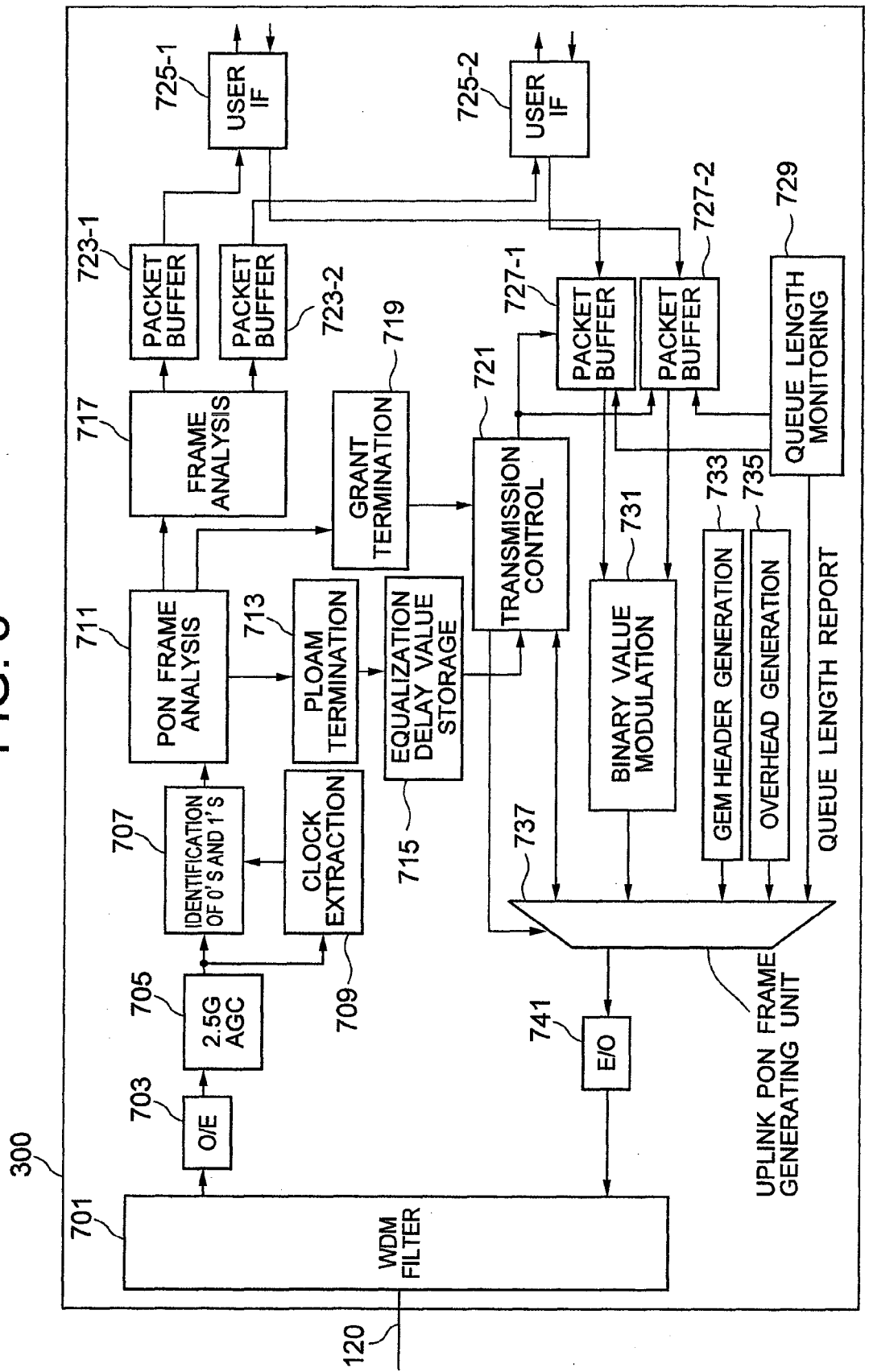
FIG. 8 is a block diagram showing a configuration example of an ONU for 2.5 G.

FIG. 8 is a block diagram showing a configuration example of an ONU for 2.5 G.

The structure of ONU 300 for 2.5 G is the same as that for an ONU used in GPON. Downlink signal 130 received from branch optical fiber 120 is converted into an electrical signal in O/E unit 703 converting, via a WDM filter 701, optical signals into electrical signals. As for this signal, since it undergoes attenuation when passing through optical fibers 110 and 120 and optical splitter 100, an identification of 0's and 1's is carried out in a binary value identifying unit 707 after it has been converted to a prescribed signal level trough a 2.5 G AGC (Automatic Gain Controller) 705, and it is used at a later stage as a control signal or data. Further, a clock extracting unit 709 extracts a clock from the received signal which is used in the identification of 0's and 1's in signals transmitted at 2.5 Gbit/s.

PON frame separating unit 711 is a unit separating the multiplexed overhead and payload in the received downlink signal 130 and when it finds the head of downlink signal 130 with frame synchronization pattern 2000, a PON control message included in PLOAM field 2001 is sent to a PLOAM termination unit 713. The detailed operation will be omitted, but in PLOAM termination unit 713, if a control message destined for its own ONU is included, this is processed and necessary settings for the operation of the ONU are carried out via a transmission control unit 721, and there is generated a control message including the monitoring result of its own ONU, control contents requested from the OLT, and the like, it being entered into PLOAM field 3002 of uplink signal 150 and transmitted to OLT 200. Further, equalization delay value storage unit 715 is a unit which, since there is a random variation in the transmission distance between each ONU 300 or 310 and OLT 200 as previously explained, stores information for delaying uplink signal 150 so that the uplink signal from each ONU does not collide with the reception unit of trunk optical fiber 110 or OLT 200. Specifically, in a procedure subsequently described in FIG. 11 to FIG. 13, since the delay quantity determined by OLT 200 is reported in a PLOAM field, this value is stored. Also, a grant termination unit 719 extracts the grant destined for its own ONU from the grants included in grant instruction field 2002 and communicates the transmission timing of the uplink signal of its own ONU to transmission control unit 721. Transmission control unit 721 controls, on the basis of this timing and a delay quantity stored in an equalization delay storage unit 817, an uplink PON frame generating unit 737 or the like, generates uplink signal 150, and transmits it to OLT 200.

Further, PON frame separating unit 711 checks the contents of GEM header 2004 multiplexed in frame payload 2003. Here, if GEM header 2004 is a header destined for its own ONU, the data of payload 2005 following the concerned GEM header are transmitted to a frame distributing unit 717, other GEM headers and payload data being discarded. Further, since signals that are multi-level modulated at a transmission speed of 10 Gbit/s are also gradually entered into payload 2006 from OLT 200, there are times when a signal identity anomaly alarm goes out from binary value identifying unit 707 and the misidentified signal is entered into PON frame separating unit 711. However, as was previously explained, the transmission speed of the data included in the payload is determined in the OLT, so as to be able to identify it, with the value of PORT ID 2007 (or Ref. 42030 in FIG. 6), included in GEM header 2004. Consequently, in PON frame separating unit 711, the system is devised so that OLT 200 and ONU 300/310 do not malfunction, this PORT ID 2007 is observed and, in case the signal is not one destined for its own ONU, this alarm is masked and the received signal is discarded or the like without transmitting it at a later stage. Further, as for the PORT ID of each ONU 300, a structure was chosen in which a value determined by OLT 200, in a procedure that will subsequently be mentioned in FIG. 11 to FIG. 13, and reported using the PLOAM field, is stored in PON frame separating unit 711. Of course, it does not matter if the value of the PORT ID predetermined in the interior of each ONU is set by a network manager or an ONU user at the time of introducing the ONU.

Frame distributing unit 717, after temporarily accumulating the received data for each destination terminal 400 or 410 in a packet buffer 723, transmits the data to each terminal 400 or 410 via a User IF 725 which is an interface with the terminals.

If the data transmitted by each terminal 400 or 410 are temporarily accumulated in a packet buffer 727 via User IF 725, they are assembled into uplink signal 150, as described hereinafter, in uplink PON frame generating unit 737 in accordance with the control of transmission control unit 721, and, after being converted into an optical signal in an E/O unit 741, are transmitted to OLT 200 via WDM filter 701 through branch fiber 120.

1. Data are read from each packet buffer 727 with only the bandwidth (the data volume authorized for transmission) determined with DBA by OLT 200 via a binary value modulating unit 731 similar to that of OLT 200 and 1.2 G payload (ref. 3210 in FIG. 3B) is generated. Further, similarly to OLT 200, it does not matter if binary value modulating unit 731 is present or absent, since the original data, being the binary values "0" and "1", can be used directly.

2. A GEM header (ref. 3200 in FIG. 3B) generated by a GEM header generating unit 733 is attached in front of 1.2 G payload 3210 and a frame payload (ref. 3004 in FIG. 3A) is generated. As for GEM header 3200, in the structure shown in FIG. 3C, the details of each byte are those specified in Rec. G.984.3 and so an explanation thereof will be omitted, but in the PON of the present invention, there was chosen a structure in which 1.2 G ONU 300 and 5G ONU 310 are identified using a PORT ID 3310 for identifying the ONUs. Further, as explained previously, this PORT ID 3310 is set in advance in each ONU 300.

3. Transmission control unit 721 enters a control message including a monitoring result of its own ONU, generated by PLOAM termination unit 713 or the like, or control contents et cetera requested of the OLT in PLOAM field 3002 of uplink signal 150. Also, a queue length monitoring unit 729 monitors the data volume accumulated in each packet buffer 727 and waiting for transmission to OLT 200 and enters this data volume as a queue length report in queue length field 3003 specified to be between PLOAM field 3002 and frame payload 3004.

4. Uplink signal 150 is assembled with there further being attached burst overhead 3110, consisting of preamble field 3000 and delimiter field 3001 generated by overhead generating unit 735, to burst data 3120 in which control signal 3115, consisting of a PLOAM field 3002 and a queue length field 3003, is attached in front of frame payload 3004. This uplink signal 150 is transmitted on the basis of a grant designated from OLT 200 with a designated timing to which guard time 3100 is also added.

FIG. 9 is a block diagram showing a configuration example of an ONU for 10 G.

The structure of ONU 310 for 10 G is a structure that is nearly the same as that of ONU 300 for 2.5 G. A downlink signal received from branch optical fiber 120 is converted into an electrical signal with O/E unit 803 converting optical signals into electrical signals via WDM filter 801. In the structure and operation of OLT 200, as previously explained, the transmission speed of downlink signal 130 converted into an electrical signal is 2.5 Gbit/s, and each signal is multiplexed in a form in which there enters a 2.5 Gbit/s signal, modulated into the binary values "0" and "1" into the overhead, the GEM header, and the payload destined for ONU 300 for 2.5 G, included in downlink signal 130, and there enters a 2.5 Gbit/s signal, in which data with a transmission speed of 10 Gbit/s have been multi-level modulated into m levels (16 levels in the present embodiment), into the payload of ONU 310 for 10 G. Since these signals undergo attenuation when passing through optical fibers 110 and 120 and optical splitter 100, the system is devised so that, after the signals have first been converted to a designated signal level via 2.5 G AGC (Automatic Gain Controller) 805, it is possible to identify binary signals in binary value identifying unit 807 and to receive control signals called overhead and GEM headers that will be used at a later stage. Moreover, since multi-level modulated data to be received in ONU 310 are also included in the signal converted into an electrical signal, this signal is also transmitted to a multi-level identifying unit 811. Further, a clock extracting unit 807 extracts a clock from the received signal and is used for the identification of 0's and 1's and for multi-level identification in the signal transmitted at 2.5 Gbit/s.

PON frame separating unit 813 is, similarly to frame separating unit 711 of the ONU for 2.5 G, a unit separating the received downlink signal 130 into multiplexed overhead and payload, the processing of frame synchronization pattern 2000 and the processing of PLOAM field 2001, grant field 2002, and GEM header 2004 being conducted in the same way as for ONU 300 for 2.5 G. That is to say that a PLOAM termination unit 815 processes control messages destined for its own ONU and carries out settings necessary for the ONU operation, generates a control message including monitoring results of its own ONU and control contents et cetera requested of the OLT, via transmission control unit 831, it being entered into PLOAM field 3002 of uplink signal 150, and transmitted to OLT 200. Also, an equalization delay value storing unit 817 stores a delay quantity determined by OLT 200. And next, a grant termination unit 819 extracts a grant destined for its own ONU and communicates the transmission timing of the uplink signal to transmission control unit 831. Transmission control unit 831 controls uplink PON frame generating unit 839 and the like on the basis of this timing and a delay quantity stored in equalization delay storing unit 817, generates uplink signal 150, and transmits it to OLT 200.

Further, if GEM header 2004 is a header destined for its own ONU, PON frame separating unit 813 transmits to frame distributing unit 717 the data (<<0>> and <<1>> binary-valued signal at a transmission speed of 10 Gbit/s) obtained by demodulating, in multi-level identifying unit 811, the payload 2005 data following this GEM header and discards other GEM headers and payload data. Further, similarly to ONU 300 for 2.5 G, since a multi-level modulated signal with a transmission speed of 10 Gbit/s and a signal with the values "0" and "1" with a transmission speed of 2.5 Gbit/s, from OLT 200, coexist and are progressively input, there is emitted an signal identification anomaly alarm from binary value identifying unit 809 or multi-level identifying unit 811, so there are cases when a misidentified signal is input into PON frame separating unit 813. However, similarly to ONU 300, the system is devised so that OLT 200 and ONU 310 do not malfunction by carrying out operations, in PON frame separating unit 813, like observing PORT ID 2007 and, in case the signal is not destined for its own ONU, masking the alarm and discarding the signal at a later stage. Further, a structure is chosen in which the PORT ID of each ONU 310 is also stored in advance in PON frame separating unit 813 or the like. Of course, it does not matter if, at the time of ONU introduction, are set with a method in which a network manager or an ONU user sets the PORT ID value predetermined in the interior of each ONU.

Figures 10A, 10B:
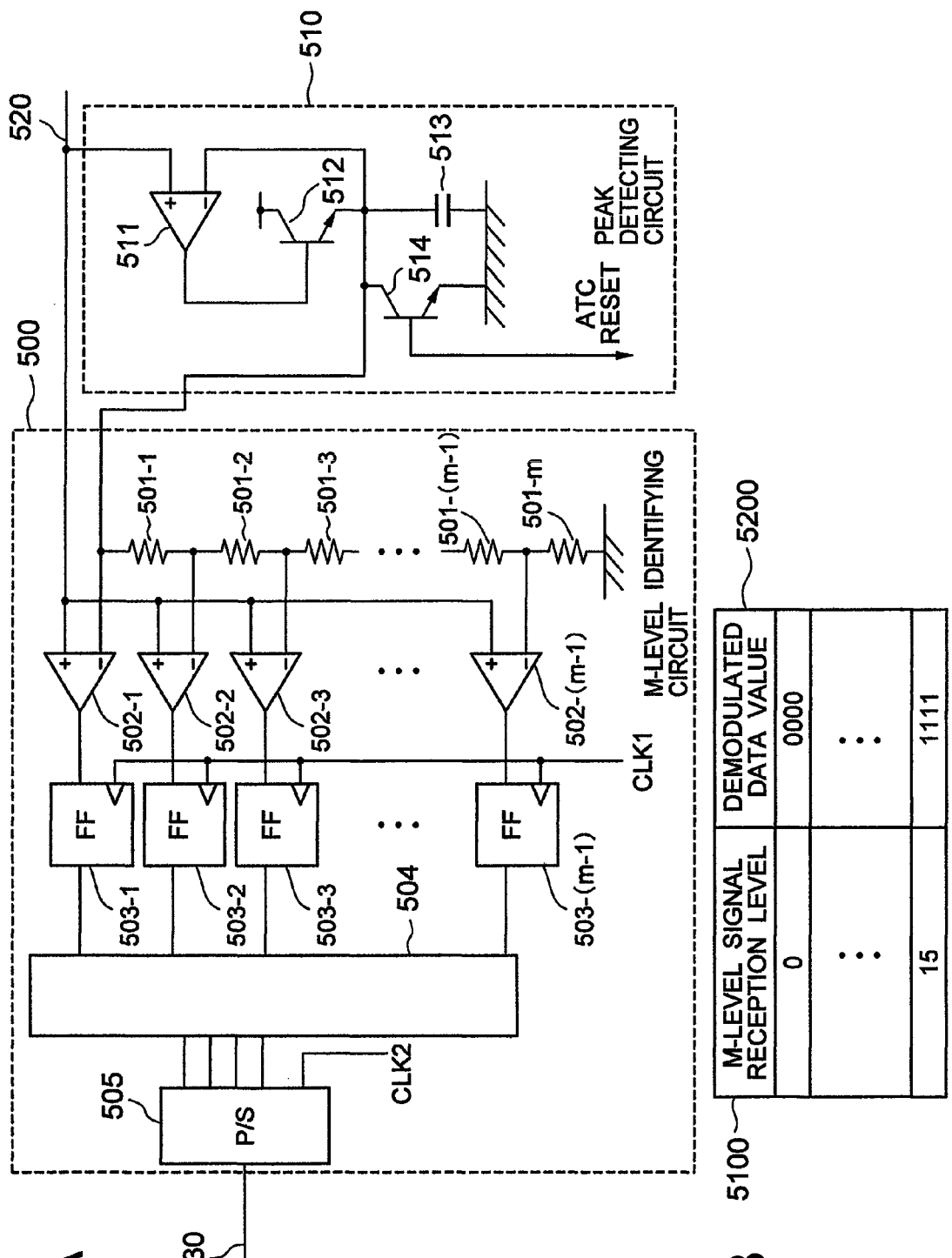
FIG. 10A is a block diagram.
FIG. 10B is a data table, showing a configuration example of a multi-level demodulating unit.

FIG. 10A is a block diagram, and FIG. 10B is a data table, showing a configuration example of a multi-level demodulating unit demodulating a multi-level modulated signal into "0" and "1" values.

In the same diagram, a peak detection circuit 510 consisting of a differential amplifier 511, transistors 512 and 514, and a capacitor 513 is a circuit included in a unit of 2.5 G AGCs 705 and 805, and is a circuit which detects and holds the maximum level (voltage) of input signals. Multi-level identifying circuit 500 is constituted by: a D/A converter consisting of, if there are m multiple levels, m resistances 501, m−1 differential amplifiers 502, and m storage elements 503 (FF) holding the outputs (binary "0" and "1" values) of the concerned differential amplifiers and converting the level (voltage) of the input electrical signals into m-bit digital signals; as well as an encoder 504 encoding the output of the concerned D/A converter; and a P/S unit 505 converting the output of the concerned encoder into serial data. Further, the structure of the D/A converter may, regardless of the aforementioned structure, be one in which it is possible to convert voltages into digital data with a designated number of bits.

As for the voltage input from input terminal 520, its maximum value is detected and held in a peak value detecting circuit and the reference voltage divided by each resistance 501 is respectively added to one end (the minus end) of each differential amplifier 502. The other end (the plus end) of differential amplifier 502 has the voltage from an input end 520 added. Since, at input end 520, multi-level digital signals are converted, with the relation previously shown in FIG. 7, into corresponding level signals and signals attenuated in the optical fibers are input, this is converted into digital signals with resistances 501 and differential amplifiers 502 and held in FFs 503. To cite an example, since, in the present embodiment, 4-bit data at 10 Gbit/s are input (ref. 5200 in FIG. 10B) with a signal converted in multi-level modulating unit 4013 of OLT 200 into data having any of the 16 levels at 2.5 Gbit/s on the basis of the relation in FIG. 7, this signal is digitized by resistances 501 and differential amplifiers 502 into a 16-bit signal (ref. 5110, not illustrated in FIGS. 10A and 10B) and, after being held in FFs 503 with a 2.5 Gbit/s clock CLK1, is demodulated by encoder 504 into the original signal (ref. 5200 in FIG. 10B). The demodulated 4-bit data are returned to serial data with 10 Gbit/s clock CLK2 in P/S unit 505 and are transmitted to PON frame separating unit 813. Further, the installation position of P/S unit 505 may be anywhere after PON frame separating unit 813.

After temporarily accumulating the received data for each destination terminal 400 or 410 in packet buffer 823, frame distributing unit 821 transmits the data to each terminal 400 or 410 via user IF 825 which is an interface with the terminal. Also, if the data transmitted by terminal 400 or 410 are temporarily accumulated in packet buffer 727 via User IF 825, uplink signal 150 is assembled by uplink PON frame generating unit 839 in accordance with the control of transmission control unit 831 after being converted into an optical signal by optical modulation unit (E/O: ref. 847), as described below, and is transmitted to OLT 200 through branch fiber 120 via WDM filter 801.

1. Data are read from each packet buffer 827 with only the bandwidth (the data volume authorized for transmission) determined with DBA by OLT 200 with a multi-level modulating unit 829 similar to that of OLT 200 and a 5 G payload (ref. 3220 in FIG. 3B) is generated in which multi-level modulated data are inserted.

2. The assembly of uplink signal 150 based on the generation of a frame payload (ref. 3004 in FIG. 3A) in which a GEM header (ref. 3200 in FIG. 3B) generated by a GEM header generating unit 833 is attached before 5 G payload 3220, and the generation of PLOAM field 3002 and queue length field 3003 by transmission control unit 831, as well as on burst overhead 3110 generated by overhead generating unit 835 is implemented by uplink PON frame generating unit 839, similarly to ONU 300 for 2.5 G. This uplink signal 130 is transmitted with a timing assigned by also attaching guard time 3100, on the basis of a grant assigned from OLT 200.

3. Timing control unit 841, operating together with transmission control unit 831, uplink PON frame generating unit 839, and level control unit 845, generates a timing controlling, in either bit or byte units, the optical signal levels of uplink signals output from ONU 310. Specifically, as mentioned above, the uplink signal from ONU 310 is a signal in which two signal types with differing optical signal levels, a burst overhead and a GEM header, with binary values "0" and "1" at a transmission speed of 1.2 Gbit/s, as well as a 5 G payload in which 5 Gbit/s data have been multi-level modulated at a transmission speed of 1.2 Gbit/s, are made to coexist, and is a signal in which this timing control unit 841 controls the optical output level of optical modulation (E/Q) unit 847 via level control unit 845, adjusts the signal level of the data inside the 5 G payload to any of the levels after multi-level modulation, and adjusts other signals (refer to FIG. 3B) to the binary values "0" and "1" (e.g. the maximum value and the minimum value).

According to the structure and operation of the aforementioned ONU 300/310, even if it becomes the case that novel high-speed data transmission such as at 10 Gbit/s is requested of a GPON operating at 2.5 Gbit/s, it becomes possible to easily provide a PON, and a communication method therefor, comprising an OLT with a structure capable of operating by accommodating in coexistence these signals with differing transmission speeds, and with a structure capable of accommodating in coexistence signals with differing transmission speeds by just selecting either of an ONU 300 for 2.5 G and an ONU 310 for 10 G and installing (substituting) it in a subscriber residence.

Hereinafter, returning once again to FIG. 4, an explanation will be given regarding the processing of uplink signal 150 in OLT 200.

On the basis of the grant or delay quantity reported by OLT 200 to each ONU 300 or 310, uplink signal 150 transmitted by each ONU 300 or 310 is, as shown in FIG. 1, multiplexed by time division on branch optical fiber 110 and received by OLT 200. Each uplink signal 150 is converted, by O/E unit 4101 converting optical signals into electrical signals, into an electrical signal via WDM filter 4027. Since this signal undergoes attenuation when passing through optical fibers 110 and 120 and optical splitter 100, it is used, after being converted to a designated signal level via 1.2 G AGC 4103 and a "0" and "1" signal identification has been carried out by binary value identifying unit 4105, as a control signal or data that will be utilized at a later stage. Further, since each uplink signal 150 is delimited with a burst-shaped guard time 3100 and received, a burst clock extracting unit 4107 extracts the clock from each received signal and is used for identification of 0's and 1's or multi-level identification of the signal transmitted at 1.2 Gbit/s.

Since, as previously explained, the optical signal level of the uplink signals from each ONU 300 or 310 has a random variation upon arrival, 1.2 G AGC 4103, for every uplink signal 150 received, carries out level measurements and adjustments (amplification and the like) of the received optical signals so that burst data 3120 can be received with certainty, using the signal of burst overhead 3110 consisting of a preamble field 3000 following guard time 3100 and a delimiter field 3001. As for post-adjustment burst data 3120 from 1.2 G AGC 4103 and input into binary value identifying unit 4105 and multi-level identifying unit 4109, each signal identification mentioned below is carried out and the data are transmitted to uplink frame analyzing unit 4111. Binary value identifying unit 4105 is a unit which is similar to the identifying units 707/809 used in ONU 300/310 and identifies, by the binary values "0" and "1", a control signal consisting of PLOAM field 3002 and queue length field 3003 inside burst data 3120 as well as GEM header 3002 of frame payload 3004 and data included in 1.2 G payload 3210. Further, the data included in 5 G payload 3220 are also input into binary value identifying unit 4105, but since the payload class is judged by uplink frame analyzing unit 4111 at a later stage by means of PORT ID 3310 inside the received GEM header, the identification of 5 G payload 3220 is ended or is discarded by uplink frame analyzing unit 4111, or an operation such as masking or discarding the detected error is carried out by the uplink frame analyzing unit. Moreover, multi-level identifying unit 4109 is a unit similar to multi-level identifying unit 811 used in ONU 310 and which, inside burst data 3120, identifies the data included in 5 G payload 3220 and demodulates data with a transmission speed of 5 Gbit/s. Further, in the present embodiment, P/S unit 505, provided in the demodulator previously explained in FIGS. 10A and 10B, was provided on the data read side of a packet buffer 4115 to be described later. Further, a control signal consisting of PLOAM field 3002 and queue length field 3003 as well as GEM header 3002 of frame payload 3004 and the data included in 1.2 G payload 3210 are input into multi-level identifying unit 4109, but since the payload class is judged at a later stage by uplink frame analyzing unit 4111 by means of PORT ID 3310 inside the received GEM header, the identification of these signals is ended or is discarded by uplink frame analyzing unit 4111, or an operation such as masking or discarding the detected error is carried out by the uplink frame analyzing unit 4111.

Uplink frame analyzing unit 4111 is a unit separating the overhead and payload attached to uplink signal 150 from each identifying unit 4105 or 4109, with a PON control message included in PLOAM field 3002 and a queue length report included in queue length field 3003 being sent to a monitoring control unit 4010. Although a detailed operation is omitted, in monitoring control unit 4010, operations like processing control messages from each ONU 300 or 310 and carrying out the settings necessary for the operation of each ONU are performed, control messages including the control contents and the like of ONU 300/310 are generated, entered into PLOAM field 2001 of downlink signal 130 and broadcast to all ONUs 300/310. Also, the timing during which data transmission is allowed for each ONU 300 or 310, determined with DBA based on a queue length report from each ONU 300 or 310 and the allowed traffic set in advance in a contract or the like, is inserted in grant instruction field 2002 and broadcast to all ONUs 300/310. Further, the ATC reset signal is a signal generated by a reset timing generating unit (ref. 4204 in FIG. 5) and is a signal which, for each uplink signal 150 received by 1.2 G AGC 4103, is transmitted in between guard times 3100 in correspondence to a grant decided by monitoring control unit 4010 to temporarily reset 1.2 G AGC 4103 so as to be able to carry out measurements and adjustments at a high speed when carrying out level measurements and adjustments (amplification and the like) of the received optical signal, so that burst data 3120 can be received with certainty.

According to the structure and operation of the aforementioned OLT 200 and ONU 300/310, 200 even if it becomes the case that novel high-speed data transmission such as at 10 Gbit/s is requested of a GPON operating at 2.5 Gbit/s, it becomes possible to receive data with certainty, be it with either an ONU for 2.5 G or an ONU for 10 G, by means of an OLT with a structure capable of operating by accommodating in coexistence these signals with differing transmission speeds. That is to say that it becomes possible to easily provide a PON, and a communication method therefor, with a structure capable of operating by accommodating in coexistence these signals with differing transmission speeds.

Hereinafter, an explanation regarding the operation of the PON will further be given using the drawings.

Figure 11:
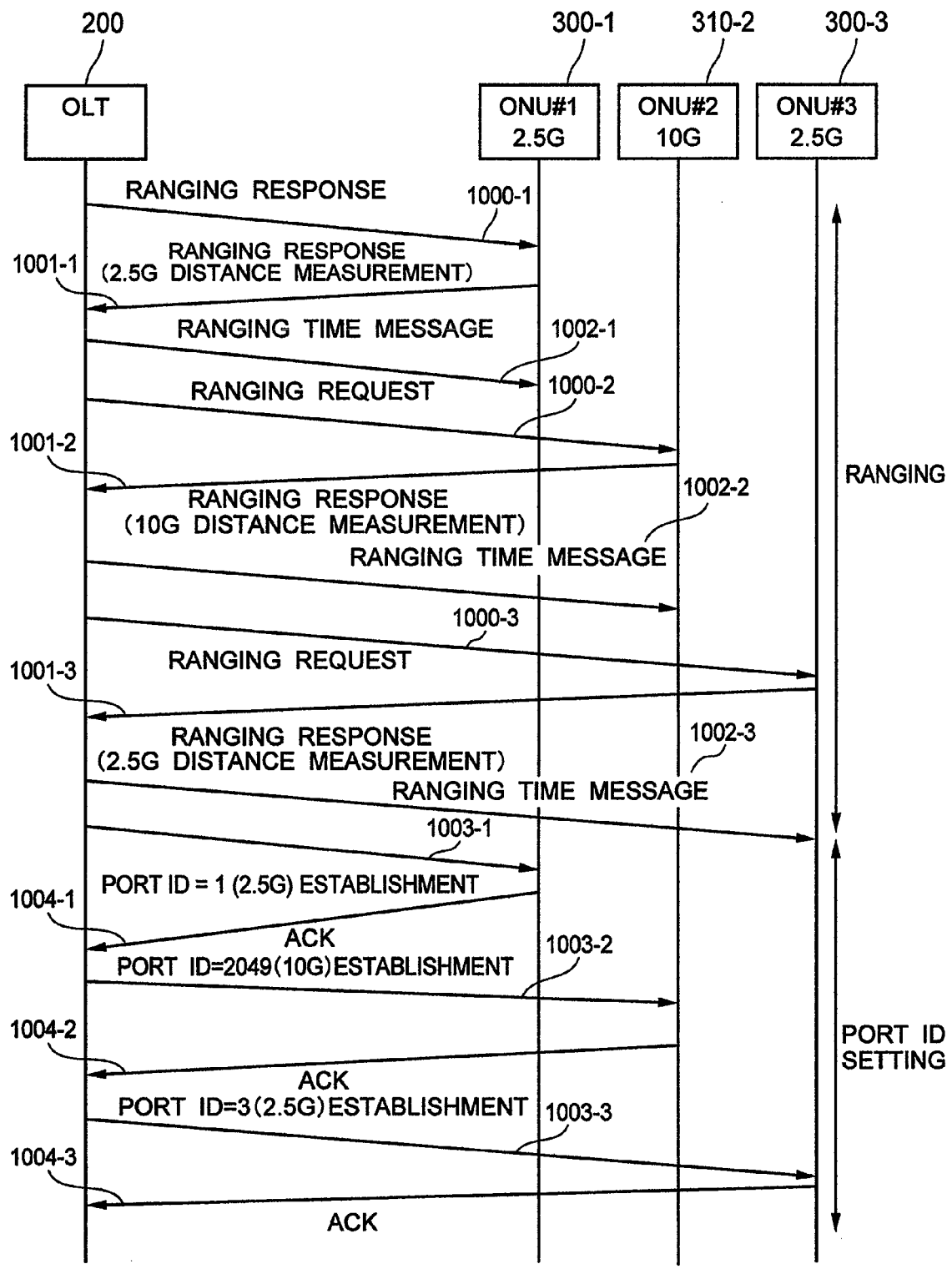
FIG. 11 is a signal sequence diagram explaining the operation of a PON.
Figure 12:
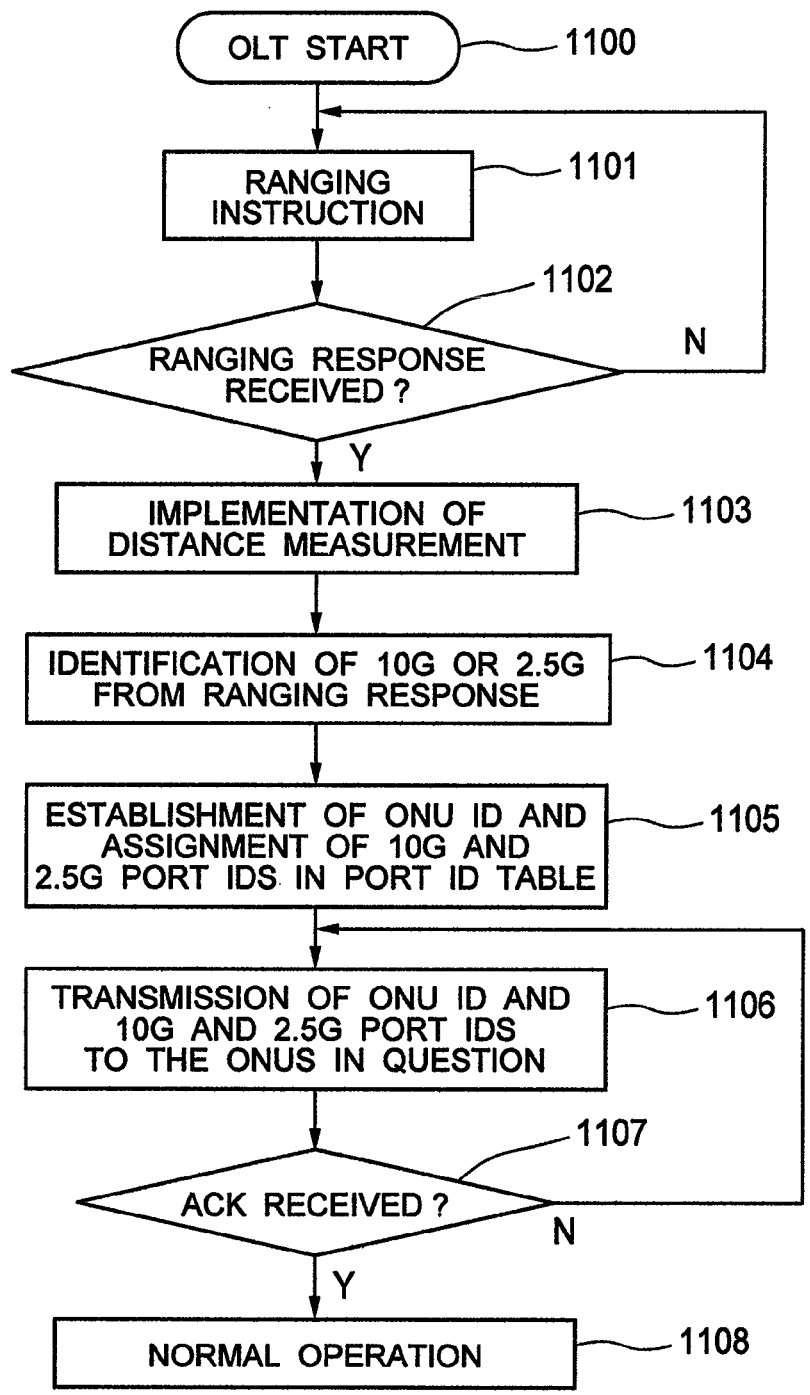
FIG. 12 is a work flow diagram showing a working example of an OLT.
Figure 13:
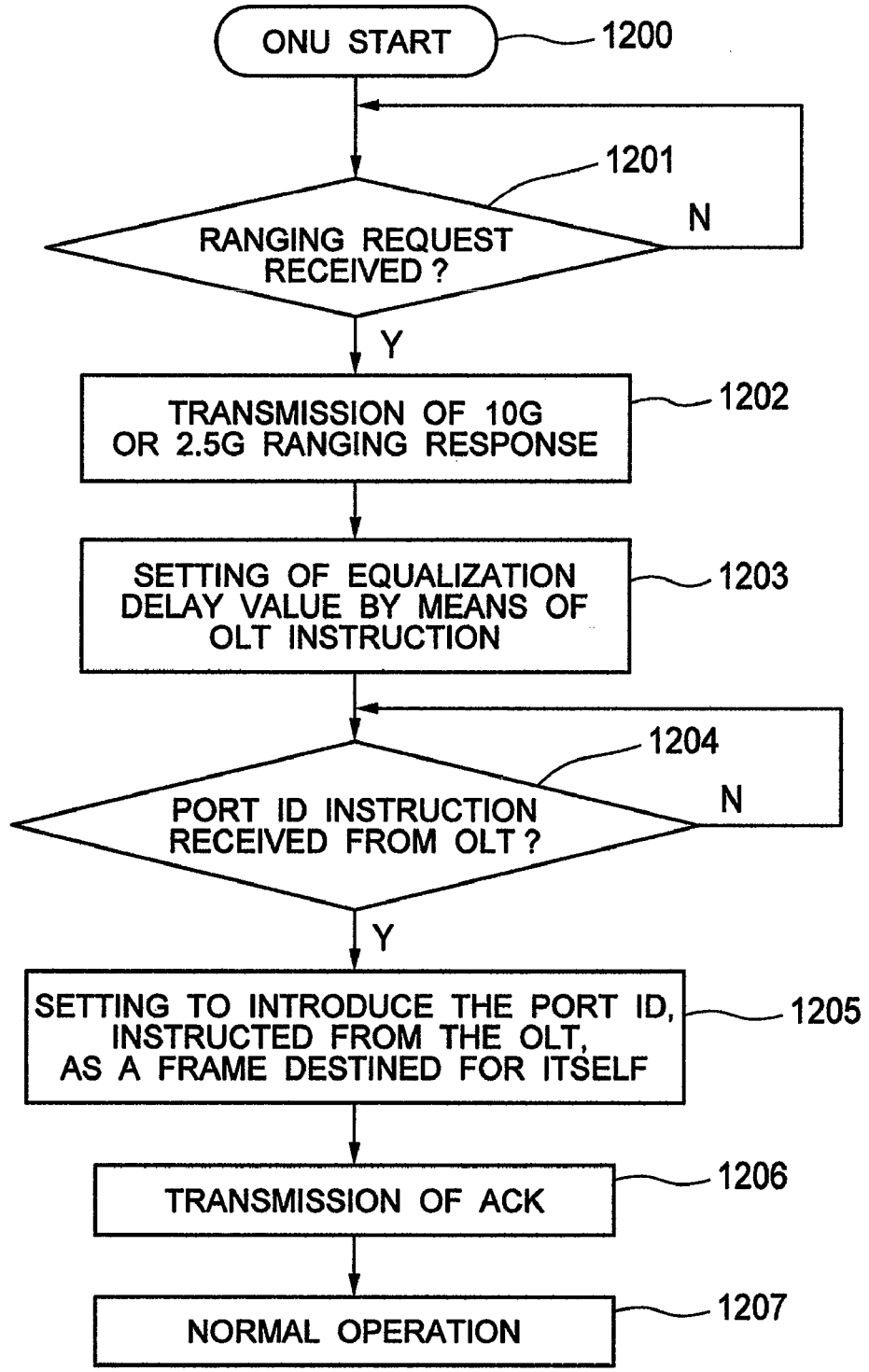
FIG. 13 is a work flow diagram showing a working example on an ONU.

FIG. 11 is a signal sequence diagram explaining the operation of a PON and FIG. 12 and FIG. 13 are work flow diagrams explaining the operation of respectively an OLT and an ONU used in a PON of the present invention.

PON 10, during system launch, gets a grasp of the distance between the previously explained OLT 200 and each ONU 300 or 310 by an operation referred to as ranging. Specifically, when OLT 200 transmits a Ranging Request message to each ONU 300 or 310 (ref. 1000 in FIG. 11) to give a ranging instruction (ref. 1101 in FIG. 12), each ONU 300 or 310 confirms receipt of this request message (ref. 1201 in FIG. 13) and transmits a Ranging Response message to OLT 200 (refs. 1001 in FIGS. 11 and 1202 in FIG. 13). When OLT 200 confirms receipt of this response message (ref. 1102 in FIG. 12), the distance between OLT 200 and an ONU 300 or 310 is measured and there is determined a delay quantity (ref. 1103 in FIG. 12) with which each ONU delays the transmission of uplink signal 150 so that uplink signals 150 from each ONU do not collide at the reception end of OLT 200, this delay quantity being reported to each ONU 300 or 310 in a Ranging Timing message (ref. 1002 in FIG. 11). Moreover, in each ONU 300 or 310, the reported delay quantity is stored (refs. 715 in FIG. 8, 817 in FIG. 9, and 1203 in FIG. 13).

In the aforementioned embodiment, an explanation was given assuming that the ONU 300/310 class and PORT ID are set in advance in OLT 200, but, as mentioned below, there may be chosen a structure in which these are set. That is to say that since the ONU set in the subscriber residence is set by determining, by subscriber choice or by contract, whether it is for 2.5 G or for 10 G, a structure is chosen in which the ONU class is entered in the previous Ranging Response message 1001, the structure being one in which a registration of the PORT ID et cetera is carried out. Specifically, when OLT 200 confirms the ONU 300/310 class from this response message (ref. 1104 in FIG. 12), ONU IDs are established, PORT IDs are assigned, and a PORT ID table (ref. 4201 in FIG. 6) is established (ref. 1105 in FIG. 12). After this, OLT 200 reports (refs. 1003 in FIGS. 11 and 1106 in FIG. 12) the contents of PORT ID table 4201 to each ONU 300 or 310. When ONU 300/310 confirms the reception of the PORT ID (ref. 1204 in FIG. 13), it stores the received information (ref. 1205 in FIG. 13) in an internal memory (not illustrated) and reports the confirmation and the completion of the storage to OLT 200 (refs. 1004 in FIGS. 11 and 1206 in FIG. 13). With the aforementioned procedure, transmission and reception of data (normal operation) between ONU 300/310 and the OLT, previously explained, becomes possible (ref. 1207 in FIG. 13). OLT 200 confirms the completion report from the ONU (ref. 1107 in FIG. 12) and begins (ref. 1108 in FIG. 12) data transmission to and reception from each ONU 300 or 310 (normal operation).

By using the aforementioned signal sequence and the operational flow of the OLT and the ONUs, the system launch of the PON, it is possible to implement all the signals at low speeds having in common 2.5 Gbit/s in the downlink and 1.2 Gbit/s in the uplink. And then, after the launch of the system has come to an end, actual data transmission and reception (operating state) becomes possible in a state where 2.5 G and 10 G coexist. That is to say that until the operating state is reached, it also becomes possible to stop the OLT or ONU multi-level modulating units 4013 and 8291 or multi-level identifying units 4109 and 811, so a reduction of the electric energy consumption of the whole system or of each device also becomes possible. Further, since actual data transmission and reception (operating state) in a state where 2.5 G and 10 G coexist become possible if one carries out a simple additional installation by just adding multi-level modulating units and multi-level demodulating units to the OLT and the ONUs of a GPON, it becomes possible to simply execution a transition to a new PON accommodating the equipment of an existing PON.

As explained above, by means of the structure and operation of a PON, OLT, and ONUs of the present invention, it becomes possible to easily provide a PON, and a communication method therefor, with a structure capable of switching over to a new PON accommodating the equipment of an existing PON and enabling operation in which PONs are made to coexist. Also, it becomes possible to easily provide a PON, and a communication method therefor, capable of operating by making coexist a plurality of PONs having differing specifications (standards). Further, even if a plurality of PONs are made to coexist, it does not occur that the contents of each PON are interpreted mistakenly nor does it occur that an alarm or a malfunction is generated. Also, in a PON in which communication signals from an OLT to a plurality of ONUs are multiplexed by time division and transmitted, it is taken to be possible to accommodate in coexistence a plurality of ONUs having differing transmission speeds and by exchanging only the corresponding OLT and ONU even if there occurs a request for an extension of the communication service capacity, it becomes possible to suppress exchange expenses for communication devices.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A passive optical network system connecting a master station and a plurality of subsidiary stations with an optical fiber network including an optical splitter, comprising:

a transmission and reception circuit transmitting first data at a first transmission speed and second data at a second transmission speed which is higher than said first transmission speed to, and receiving the same from, other networks;

a conversion circuit converting said second data to third data having said first transmission speed;

an inverse conversion circuit inversely converting said third data into said second data;

a frame assembly circuit assembling data received with said first transmission and reception circuit and a first overhead used in the control of said subsidiary stations into a frame which is multiplexed by time division;

a first transmission circuit transmitting said frame to a plurality of subsidiary stations;

a first reception circuit receiving burst data transmitted by said plurality of subsidiary stations; and a burst data separation circuit separating respectively a second overhead, received by said first reception circuit, and burst data, consisting of said first data or third data from said second overhead and first data or third data;

wherein:

said master station multiplexes by time division said overhead, said received first data, and said converted third data into said frame and transmits said frame at said first transmission speed to said plurality of subsidiary stations;

said plurality of subsidiary stations consist of a plurality of first subsidiary stations receiving first data and a plurality of second subsidiary stations provided with an inverse conversion circuit inversely converting said third data into said second data and a conversion circuit converting said second data into third data with said first transmission speed;

said first subsidiary stations respectively receive said overhead and first data destined for themselves from said frame received from said master station and transmit burst data consisting of said second overhead and first data to said master station;

said second subsidiary stations respectively receive said overhead and third data destined for themselves from said frame received from said master station, inversely convert said third data into said second data with said inverse conversion circuit, and transmit to said master station burst data consisting of said second overhead and said third data obtained by converting said second data with said conversion circuit; and said master station receives the respective burst data transmitted by said first subsidiary stations and second subsidiary stations, inversely converts said received third data into said second data with said inverse conversion circuit, and transmits said first data and second data via said first transmission and reception circuit to said other networks.

2. The passive optical network system according to claim 1, wherein:

there is included an identifier identifying in said overhead whether the data transmitted to and received from said master station and plurality of subsidiary stations are said first data or second data; and said identifier is respectively stored in said master station and plurality of subsidiary stations; said conversion circuit and inverse conversion circuit are controlled on the basis of the stored identifier; and said first data and second data are transmitted and received.

3. The passive optical network system according to claim 1, wherein said conversion circuit is a circuit converting a dual-value signal of said second data with a second transmission speed M (being an integer) times greater than a first transmission speed into an m-level ($m>2$, $2^M$) signal with said first transmission speed, said inverse conversion circuit being a circuit carrying out inverse conversion with respect to said conversion circuit.

* * * * *